(12) United States Patent
Watanabe et al.

(10) Patent No.: US 8,094,160 B2
(45) Date of Patent: Jan. 10, 2012

(54) MOVING-PICTURE PROCESSING APPARATUS AND PRE-FETCH CONTROL METHOD

(75) Inventors: Yasuhiro Watanabe, Kawasaki (JP); Mitsuharu Wakayoshi, Fukuoka (JP); Naoyuki Takeshita, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 1153 days.

(21) Appl. No.: 11/896,640

(22) Filed: Sep. 4, 2007

(65) Prior Publication Data

US 2008/0059716 A1  Mar. 6, 2008

(30) Foreign Application Priority Data

Sep. 4, 2006  (JP) ................. 2006-238457

(51) Int. Cl.
*G09G 5/36* (2006.01)
*G06F 13/00* (2006.01)
*G06F 13/28* (2006.01)

(52) U.S. Cl. .......... 345/557; 345/547; 711/137

(58) Field of Classification Search ............ 345/547, 345/557; 711/137
See application file for complete search history.

(56) References Cited

U.S. PATENT DOCUMENTS

| 5,912,676 | A | * | 6/1999 | Malladi et al. | 345/531 |
| 5,966,734 | A | * | 10/1999 | Mohamed et al. | 711/173 |
| 6,119,222 | A | * | 9/2000 | Shiell et al. | 712/238 |
| 7,032,076 | B2 | * | 4/2006 | Sprangle et al. | 711/137 |
| 2004/0268051 | A1 | * | 12/2004 | Berg et al. | 711/137 |

FOREIGN PATENT DOCUMENTS

| JP | 2002-163150 | 6/2002 |
| JP | 2006-31480 | 2/2006 |

* cited by examiner

*Primary Examiner* — Aaron M Richer
*Assistant Examiner* — Robert Craddock
(74) *Attorney, Agent, or Firm* — Staas & Halsey LLP

(57) ABSTRACT

A moving-picture processing apparatus has a pre-fetch memory pre-fetching a portion of a decoded picture stored in an external memory, and a miss/hit determination unit determining a manner in which a miss occurs in response to a read request to the pre-fetch memory.

12 Claims, 14 Drawing Sheets

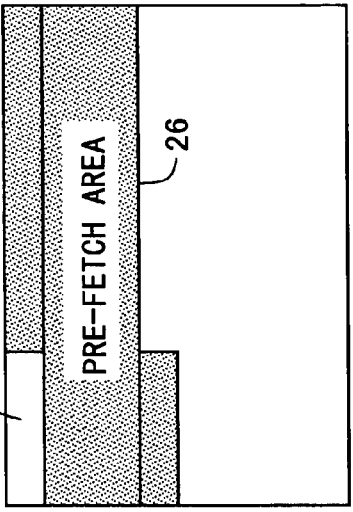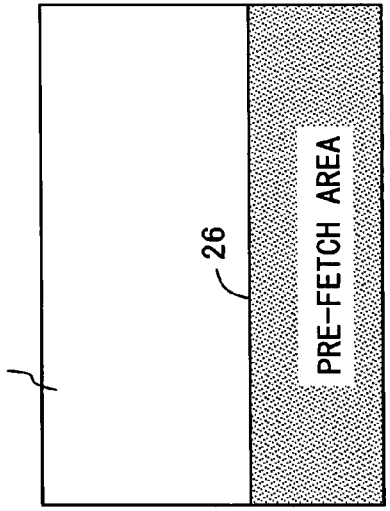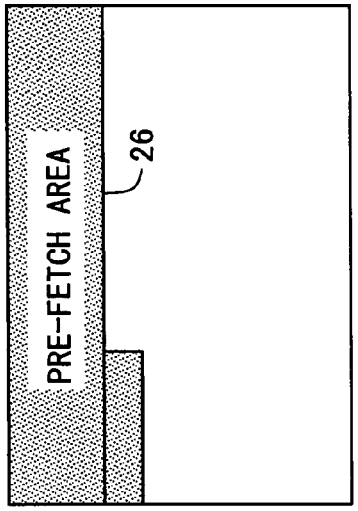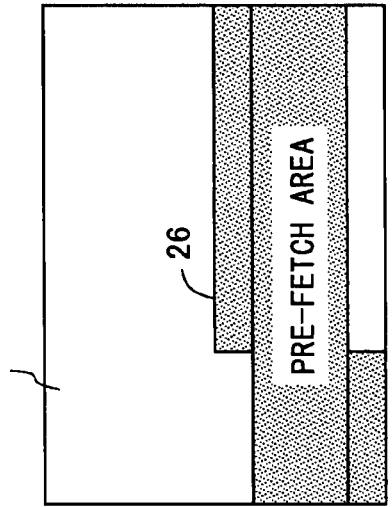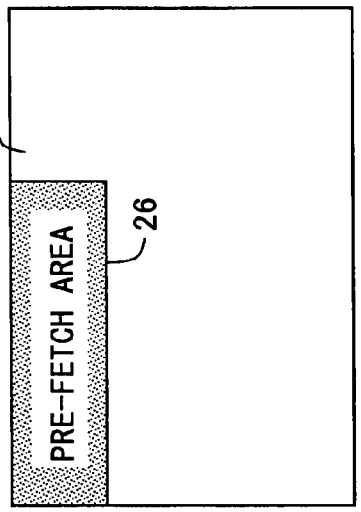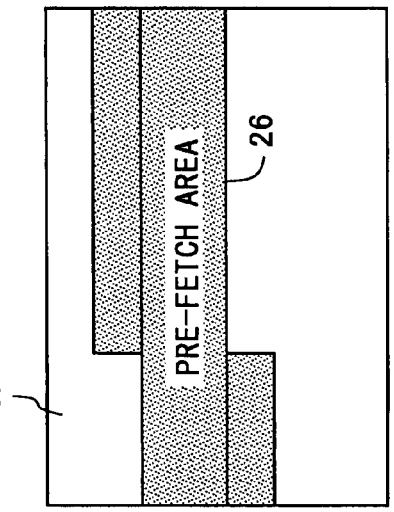

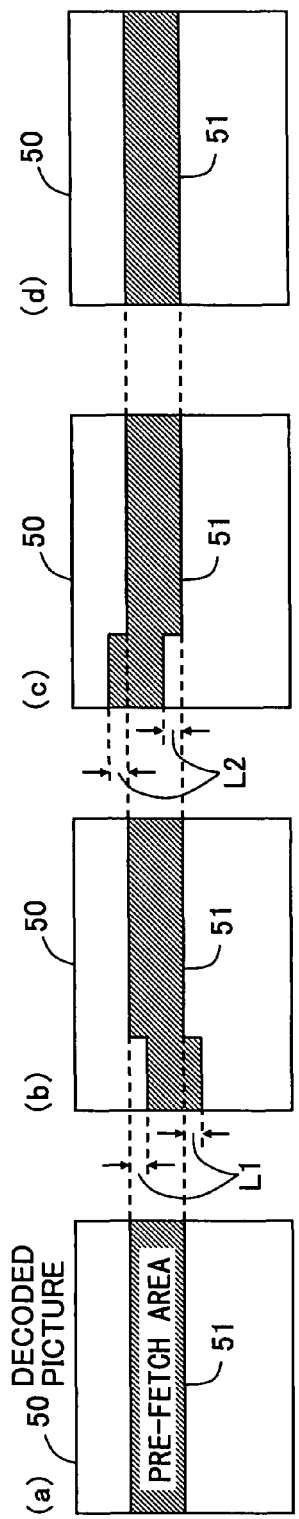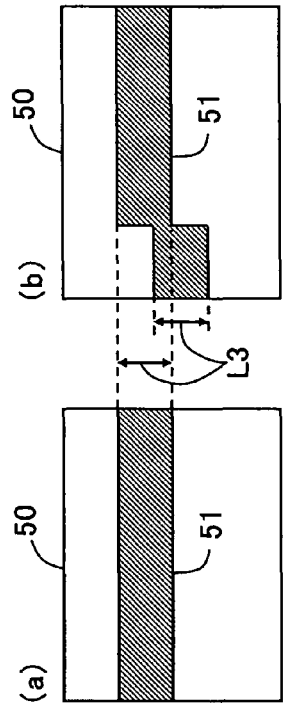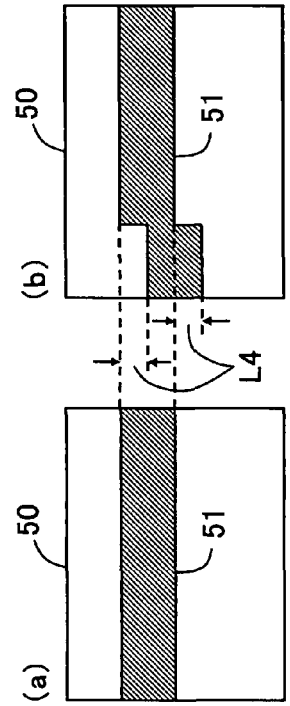
FIG.7A
FIG.7B
FIG.7C

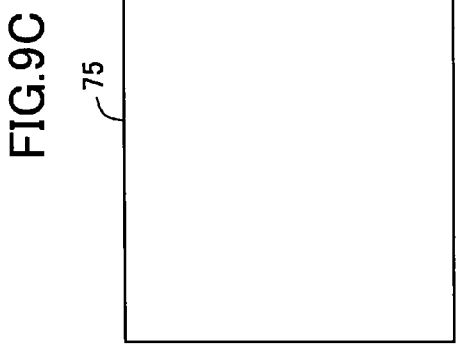 FIG.9A 75 DECODED PICTURE 76 PRE-FETCH AREA

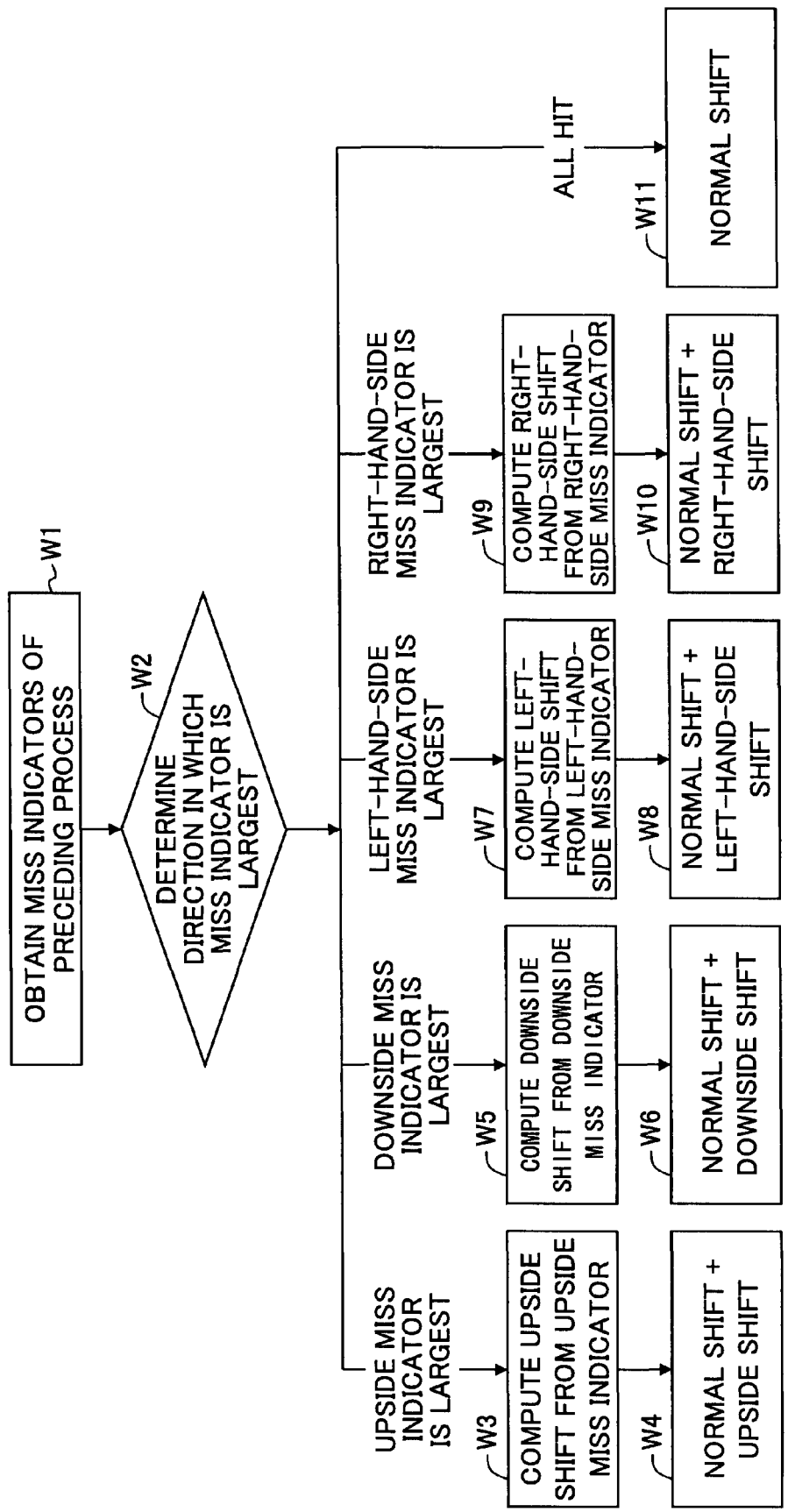

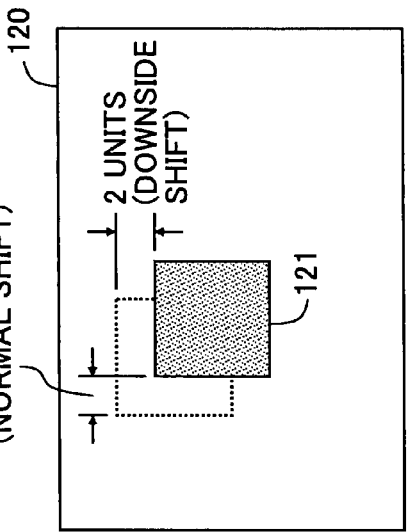
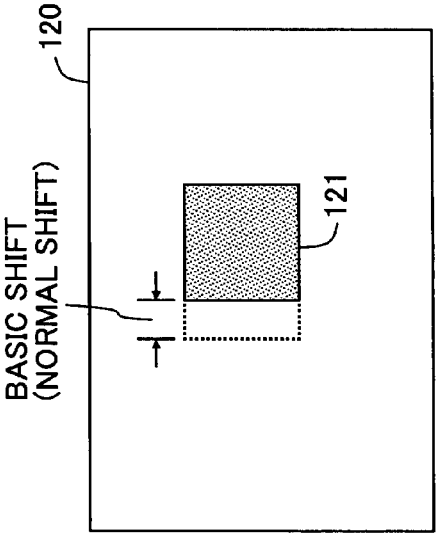
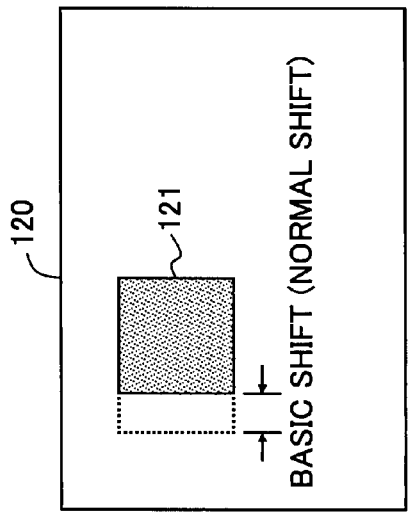
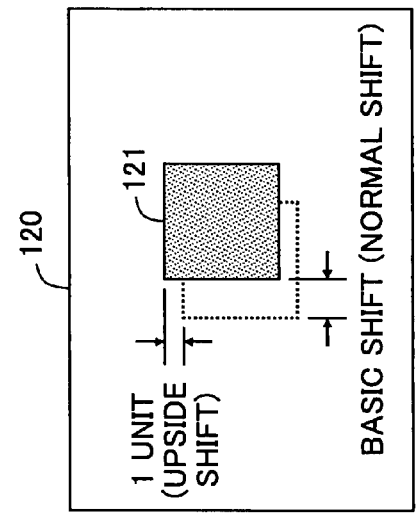
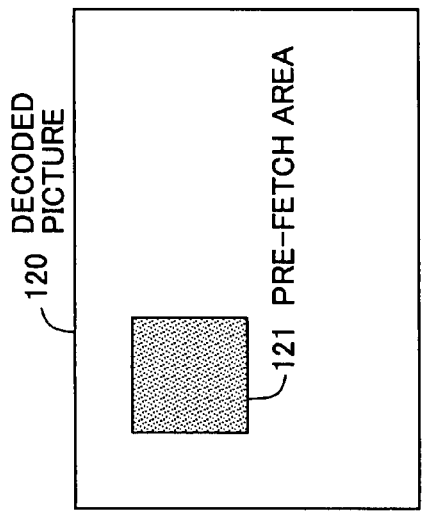
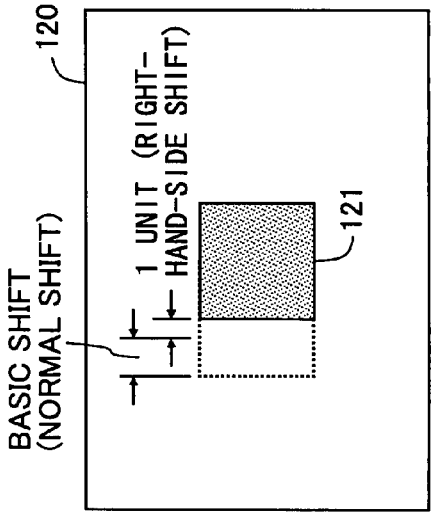

MOVING-PICTURE PROCESSING APPARATUS AND PRE-FETCH CONTROL METHOD

CROSS-REFERENCE TO RELATED APPLICATIONS

The present application is based upon and claims the benefit of priority from the prior Japanese Patent Application No. 2006-238457 filed on Sep. 4, 2006, with the Japanese Patent Office, the entire contents of which are incorporated herein by reference.

BACKGROUND OF THE INVENTION

1. Field of the Invention

The present invention generally relates to moving-picture processing apparatuses and methods for pre-fetch control, and particularly relates to a moving-picture processing apparatus provided with a pre-fetch memory and a method for pre-fetch control in such a moving-picture processing apparatus.

2. Description of the Related Art

Patent Document 1 shows a MPEG decoder with a cache memory and an external memory where the MPEG decoder decodes an MPEG stream that is compressed and coded according to the MPEG (Moving Picture Expert Group). The cache memory serves to pre-fetch and store a portion of a decoded picture stored in the external memory.

There is a technology that utilizes image feature parameters in order to improve a hit rate with respect to the cache memory (see Patent Document 1). The method that utilizes image feature parameters for the purpose of improving a hit rate with respect to the pre-fetch memory requires highly sophisticated computation such as predicting a pre-fetch area required for a next step after decoding a moving vector according to the MPEG decoding process.

Accordingly, there is a need for a moving-picture processing apparatus and a pre-fetch control method that can improve a hit rate of a rectangle-read request issued from a predetermined circuit with respect to a cache memory without performing complex computation such as the reconstructing of a moving vector and the predicting of a pre-fetch area, thereby improving the processing speed of the predetermined circuit.

[Patent Document 1] Japanese Patent Application Publication No. 2006-31480

[Patent Document 2] Japanese Patent Application Publication No. 2002-163150

SUMMARY OF THE INVENTION

To achieve these and other advantages in accordance with the purpose of the invention, the invention provides a moving-picture processing apparatus, which includes a pre-fetch memory configured to pre-fetch, as a pre-fetch area, a portion of a decoded picture stored in an external memory, and a miss/hit determination unit configured to determine a manner in which a miss occurs in response to a read request that is made with respect to the pre-fetch memory.

According to another aspect of the present invention, a method of processing a moving picture in a moving-picture processing apparatus including a pre-fetch memory configured to pre-fetch, as a pre-fetch area, a portion of a decoded picture stored in an external memory, includes a step of determining a manner in which a miss occurs in response to a read request that is made with respect to the pre-fetch memory.

BRIEF DESCRIPTION OF THE DRAWINGS

FIGS. 2A through 2F are drawings showing an example of transitions of a pre-fetch area in a decoded picture stored in the external memory as pre-fetched by a pre-fetch memory under the control of a pre-fetch control unit in the MPEG decoder that is the first embodiment of a moving-picture processing apparatus according the present invention;

FIGS. 7A through 7C are drawings for explaining the adjustment of a pre-fetch area by the pre-fetch control unit provided in the MPEG decoder that is the first embodiment of a moving-picture processing apparatus according the present invention;

FIGS. 9A through 9F are drawings showing an example of transitions of a pre-fetch area in a decoded picture stored in the external memory as pre-fetched by a pre-fetch memory under the control of a pre-fetch control unit in the MPEG encoder that is the second embodiment of a moving-picture processing apparatus according the present invention;

FIG. 13 is a flowchart showing the adjustment of a pre-fetch area by a pre-fetch control unit provided in the MPEG encoder that is the second embodiment of a moving-picture processing apparatus according the present invention; and FIGS. 14A through 14F are drawings showing an example of transitions of a pre-fetch area in a decoded picture stored in the external memory as pre-fetched by a pre-fetch memory under the control of a pre-fetch control unit in the MPEG encoder that is the second embodiment of a moving-picture processing apparatus according the present invention.

DESCRIPTION OF THE PREFERRED EMBODIMENTS

Features and advantages of the present invention will be presented in the description which follows, and in part will become apparent from the description and the accompanying drawings, or may be learned by practice of the invention according to the teachings provided in the description. Objects as well as other features and advantages of the present invention will be realized and attained by a moving-picture processing apparatus and a pre-fetch control method particularly pointed out in the specification in such full, clear, concise, and exact terms as to enable a person having ordinary skill in the art to practice the invention.

In the following, a description will be given of first and second embodiments of a moving-picture processing apparatus according to the present invention together with a pre-fetch control method according to the present invention with reference to the accompanying drawings.

First Embodiment of Moving-Picture Processing Apparatus

Figure 1:
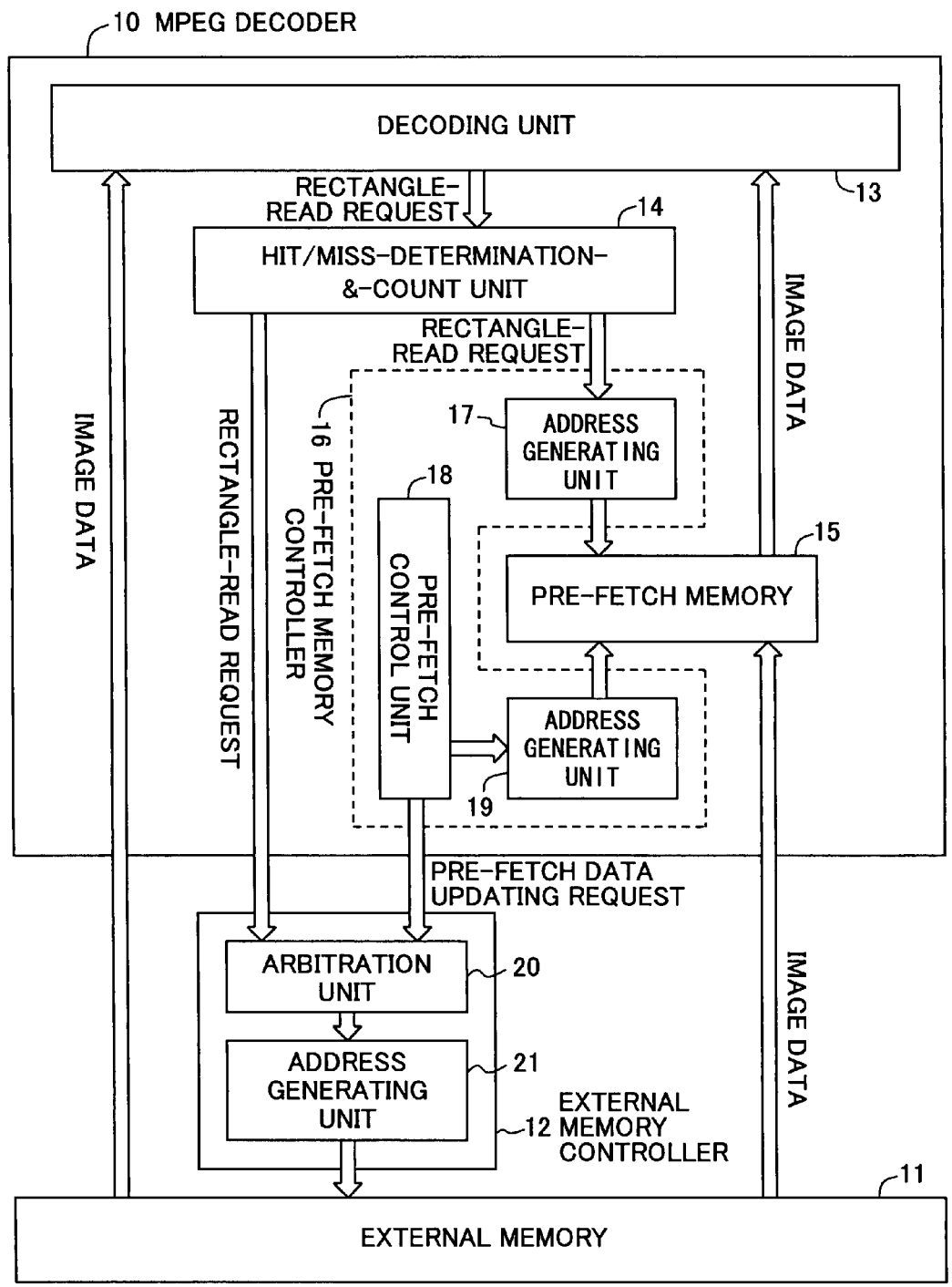
FIG. 1 is a drawing showing an MPEG decoder that is a first embodiment of a moving-picture processing apparatus according the present invention together with an external memory and an external memory controller.

FIG. 1 is a drawing showing an MPEG decoder that is a first embodiment of a moving-picture processing apparatus according the present invention together with an external memory and an external memory controller. In FIG. 1, an MPEG decoder 10 that is the first embodiment of a moving-picture processing apparatus according to the present invention decodes an MPEG stream that is compressed and coded according to the MPEG standard. An external memory 11 serves to store decoded pictures decoded by the MPEG decoder 10 that is the first embodiment of a moving-picture processing apparatus according to the present invention. An external memory controller 12 controls the reading of an image from the external memory 11

The MPEG decoder 10 that is the first embodiment of a moving-picture processing apparatus according to the present invention includes a decoding unit 13, a hit/miss-determination-&-count unit 14, a pre-fetch memory 15, and a pre-fetch memory controller 16.

The decoding unit 13 performs computation necessary to decode an MPEG stream. The decoding unit 3 issues a rectangle-read request to the hit/miss-determination-&-count unit 14 when the decoding unit 3 uses, as a reference image, a rectangular portion of a decoded picture stored in the external memory 11.

The hit/miss-determination-&-count unit 14 determines whether a rectangle-read request issued by the decoding unit 13 causes a hit with respect to the pre-fetch memory 15, i.e., whether the entire image of the rectangle portion of the decoded image requested by the rectangle-read request is present in the pre-fetch memory 15. The hit/miss-determination-&-count unit 14 issues a rectangle-read request to the pre-fetch memory 15 in the case of a hit, and issues a rectangle-read request to the external memory controller 12 in the case of a miss. The hit/miss-determination-&-count unit 14 also counts the number of hits and the numbers of misses with respect to respective types of misses as will later be described.

The pre-fetch memory 15 serves to pre-fetch and store a portion of a decoded picture stored in the external memory 11. The pre-fetch memory controller 16 serves to control the reading of an image from the pre-fetch memory 15 and the updating of pre-fetched data, and includes an address generating unit 17, a pre-fetch control unit 18, and an address generating unit 19.

The address generating unit 17 receives a rectangle-read request issued from the hit/miss-determination-&-count unit 14, and generates an address based on the information indicative of position and size of a rectangle portion of a decoded picture requested by the decoding unit 13 as contained in the rectangle-read request. The generated address is supplied to the pre-fetch memory 15.

Each time the decoding unit 13 decodes one macroblock, the pre-fetch control unit 18 generates a pre-fetch data updating request for provision to the external memory controller 12 and to the address generating unit 19 for the purpose of updating a pre-fetch area pre-fetched in the pre-fetch memory 15. The pre-fetch data updating request includes information indicative of position and size of a rectangular portion that is to be pre-fetched.

In this example, the pre-fetch control unit 18 starts updating from the left-hand side of the pre-fetched area each time the decoding unit 13 finishes decoding for one macroblock line. In this case, the position and vertical size of a pre-fetch area will be adjusted by controlling the information indicative of position and size of a rectangle portion contained in a pre-fetch data updating request based on the number of hits and the numbers of misses for respective miss types counted by the hit/miss-determination-&-count unit 14 according to the rectangle-read requests issued by the decoding unit 13 during the decoding of the preceding macroblock line.

The address generating unit 19 receives a pre-fetch data updating request from the pre-fetch control unit 18, and generates an address based on the information indicative of position and size of a pre-fetch area contained in the pre-fetch data updating request. The generated address is supplied to the pre-fetch memory 15. Upon receiving the address from the address generating unit 19, the pre-fetch memory 15 updates the pre-fetch area by storing image data transferred from the external memory 11.

The external memory controller 12 includes an arbitration unit 20 and an address generating unit 21. The arbitration unit 20 serves to arbitrate between a rectangle-read request issued by the hit/miss-determination-&-count unit 14 and a pre-fetch data updating request issued by the pre-fetch control unit 18 in terms of which is to be transferred to the address generating unit 21.

Upon receiving a rectangle-read request from the hit/miss-determination-&-count unit 14 via the arbitration unit 20, the address generating unit 21 generates an address to be supplied to the external memory 11 based on the information indicative of position and size of a rectangular area of a decoded picture requested by the decoding unit 13 as contained in the rectangle-read request. Upon receiving a pre-fetch data updating request from the pre-fetch control unit 18 via the arbitration unit 20, the address generating unit 21 generates an address to be supplied to the external memory 11 based on the information indicative of position and size of a pre-fetch area to be pre-fetched as contained in the pre-fetch data updating request.

Image data retrieved from the external memory 11 in response to a rectangle-read request from the hit/miss-determination-&-count unit 14 is transferred to the decoding unit 13. Image data retrieved from the external memory 11 in response to a pre-fetch data updating request from the pre-fetch control unit 18 is transferred to the pre-fetch memory 15.

FIGS. 2A through 2F are drawings showing an example of transitions of a pre-fetch area in a decoded picture stored in the external memory 11 as pre-fetched by the pre-fetch memory 15 under the control of the pre-fetch control unit 18.

FIG. 2 shows a decoded picture 25 stored in the external memory 11 and a pre-fetch area 26 pre-fetched to the pre-fetch memory 15.

In the MPEG decoder 10 that is the first embodiment of a moving-picture processing apparatus according to the present invention, pre-fetching starts from the top-left corner of the decoded picture 25 as shown in FIG. 2A. The pre-fetch area 26 is then expanded to the right. After the pre-fetch area 26 reaches the right-hand-side edge of the decoded picture 25, pre-fetching continues from the left-hand-side edge of the decoded picture 25 as shown in FIG. 2B.

When the pre-fetch memory 15 is filled with image data, the pre-fetch area 26 is removed from its top-left corner as shown in FIG. 2C while pre-fetching of new data continues at the bottom-left position. Such pre-fetching continues as shown in FIG. 2D and FIG. 2E. When the pre-fetch area 26 reaches the bottom-right corner of the decoded picture 25 as shown in FIG. 2F, pre-fetching comes to an end.

In the MPEG decoder 10 that is the first embodiment of a moving-picture processing apparatus according to the present invention, the pre-fetch operation as described above is performed under the control of the pre-fetch control unit 18 in conjunction with the decoding process performed by the decoding unit 13. When updating is performed on the left-hand side of the pre-fetch area upon the completion of decoding of one macroblock line performed by the decoding unit 13, the updated position and vertical size of the pre-fetch area are adjusted according to need in response to the pre-fetch data updating request issued by the pre-fetch control unit 18.

FIG. 2D, for example, shows the way the pre-fetch area 26 is removed from its top-left corner while the pre-fetching of new data continues at the bottom-left position. In this example, the vertical size of the newly pre-fetched area and the removed area (i.e., updated vertical size) is enlarged, compared with the case shown in FIG. 2C. This is because a downside miss indicator, which will later be described, is larger than an upside miss indicator with respect to the decoding process performed by the decoding unit 13 for the preceding macroblock line.

In the MPEG decoder 10 that is the first embodiment of a moving-picture processing apparatus according to the present invention, the type of miss caused by a rectangle-read request issued by the decoding unit 13 with respect to the pre-fetch memory 15 is classified into four miss types, i.e., "upside complete miss", "upside partial miss", "downside partial miss", and "downside complete miss"

Table 1 shows the definitions of "upside complete miss", "upside partial miss", "hit", "downside partial miss", and "downside complete miss" that are used in the MPEG decoder 10 that is the first embodiment of a moving-picture processing apparatus according the present invention.

TABLE 1

| | |
|---|---|
| Upside Complete Miss: | The entirety of a rectangular portion of a decoded picture requested by the decoding unit 13 is fully included in a non-pre-fetch area above the pre-fetch area. |
| Upside Partial Miss: | The rectangular portion of a decoded picture requested by the decoding unit 13 straddles the border between the pre-fetch area and a non-pre-fetch area situated above the pre-fetch area. |
| Hit: | The entirety of a rectangular portion of a decoded picture requested by the decoding unit 13 is fully included in the pre-fetch area. |
| Downside Partial Miss: | The rectangular portion of a decoded picture requested by the decoding unit 13 straddles the border between the pre-fetch area and a non-pre-fetch area situated below the pre-fetch area. |
| Downside Complete Miss: | The entirety of a rectangular portion of a decoded picture requested by the decoding unit 13 is fully included in a non-pre-fetch area below the pre-fetch area. |

Figure 3:
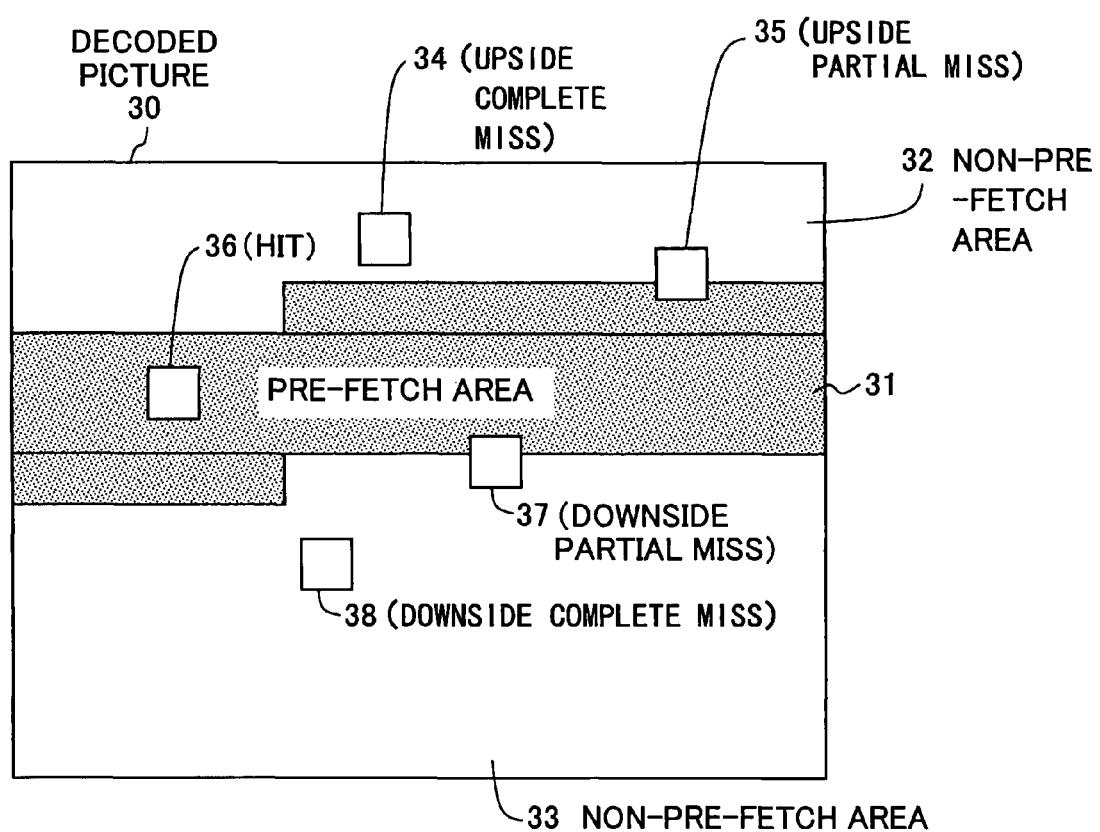
FIG. 3 is a drawing for explaining specific examples of miss types used in the MPEG decoder that is the first embodiment of a moving-picture processing apparatus according the present invention.

FIG. 3 is a drawing for explaining specific examples of the miss types. FIG. 3 shows a decoded picture 30 stored in the external memory 11, a pre-fetch area 31 pre-fetched in the pre-fetch memory 15, and non-pre-fetch areas 32 and 33 that are not pre-fetched in the pre-fetch memory 15.

The upside complete miss refers to the case in which the entirety of a rectangular portion of the decoded picture 30 requested by the decoding unit 13 is fully included in the non-pre-fetch area 32 situated above the pre-fetch area 31 as is a rectangular portion 34.

The upside partial miss refers to the case in which the rectangular portion of the decoded picture 30 requested by the decoding unit 13 straddles the border between the pre-fetch area 31 and the non-pre-fetch area 32 situated above the pre-fetch area 31 as does a rectangular portion 35.

The hit refers to the case in which the entirety of a rectangular portion of the decoded picture 30 requested by the decoding unit 13 is fully included in the pre-fetch area 31 as is a rectangular portion 36.

The downside partial miss refers to the case in which the rectangular portion of the decoded picture 30 requested by the decoding unit 13 straddles the border between the pre-fetch area 31 and the non-pre-fetch area 33 situated below the pre-fetch area 31 as does a rectangular portion 37.

The downside complete miss refers to the case in which the entirety of a rectangular portion of the decoded picture 30 requested by the decoding unit 13 is fully included in the non-pre-fetch area 33 situated below the pre-fetch area 31 as is a rectangular portion 38.

Figure 4:
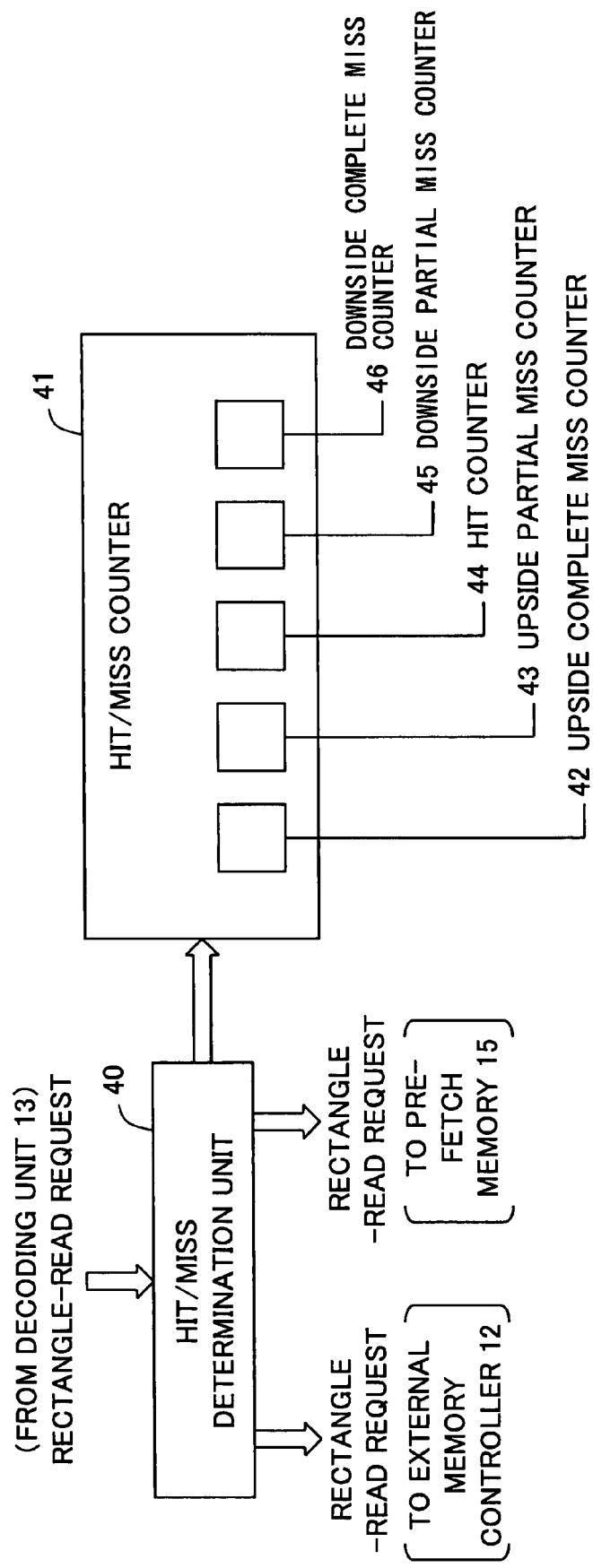
FIG. 4 is a block diagram showing a hit/miss-determination-&-count unit provided in the MPEG decoder that is the first embodiment of a moving-picture processing apparatus according the present invention.

FIG. 4 is a block diagram showing the hit/miss-determination-&-count unit 14. The hit/miss-determination-&-count unit 14 includes a hit/miss determination unit 40 and a hit/miss counter 41.

The hit/miss determination unit 40 determines whether a rectangle-read request issued by the decoding unit 13 causes a hit with respect to the pre-fetch memory 15, and notifies the hit/miss counter 41 of the result of determination by indicating an upside complete miss, an upside partial miss, a hit, a downside partial miss, or a downside complete miss. Further, the hit/miss determination unit 40 issues a rectangle-read request to the pre-fetch memory 15 in the case of a hit, and issues a rectangle-read request to the external memory controller 12 in the case of a miss.

The hit/miss counter 41 includes an upside complete miss counter 42, an upside partial miss counter 43, a hit counter 44, a downside partial miss counter 45, and a downside complete miss counter 46.

The upside complete miss counter 42 counts the number of upside complete misses. The upside partial miss counter 43 counts the number of upside partial misses. The hit counter 44 counts the number of hits. The downside partial miss counter 45 counts the number of downside partial misses. The downside complete miss counter 46 counts the number of downside complete misses.

Figure 5:
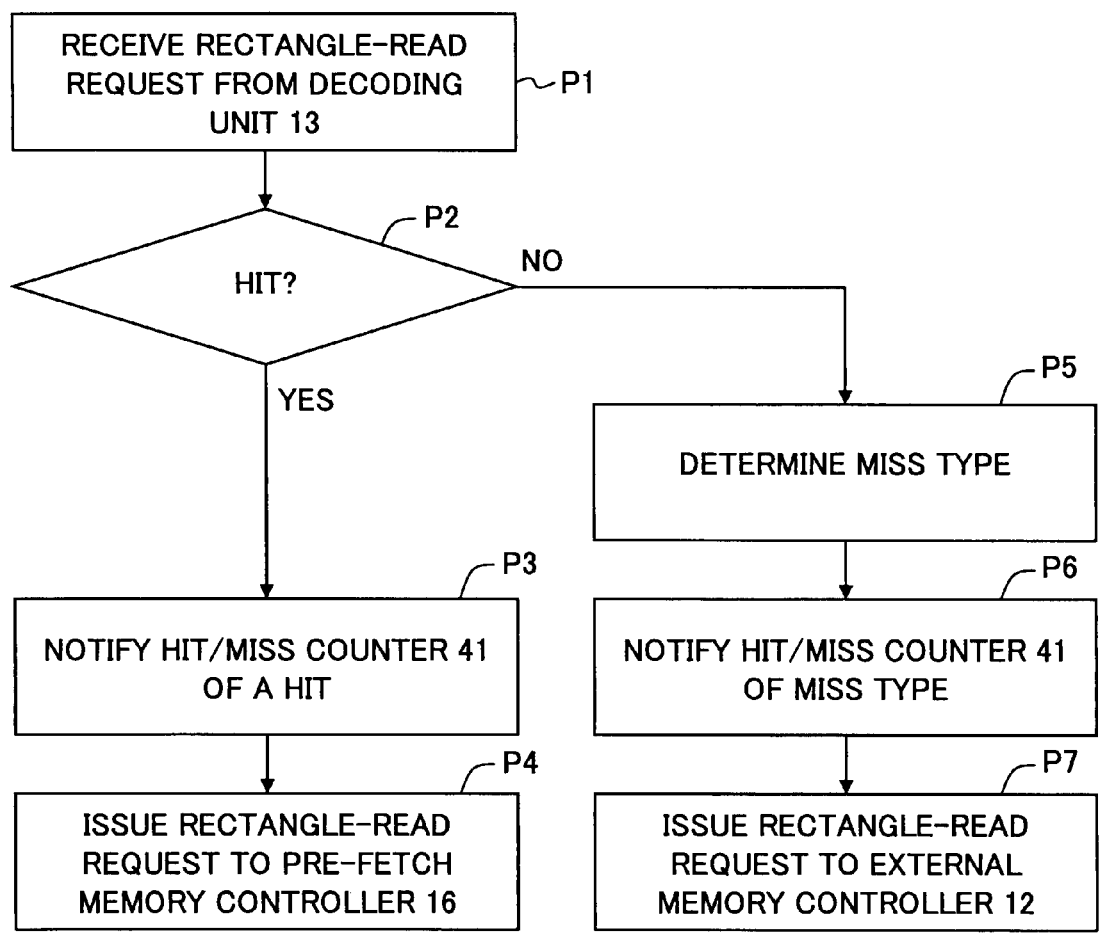
FIG. 5 is a flowchart showing the operation of a hit/miss determination unit provided in the MPEG decoder that is the first embodiment of a moving-picture processing apparatus according the present invention.

FIG. 5 is a flowchart showing the operation of the hit/miss determination unit 40. The hit/miss determination unit 40 receives a rectangle-read request from the decoding unit 13 (step P1), and determines whether the rectangle-read request causes a hit with respect to the pre-fetch memory 15 (step P2). In the case of a hit (YES at step P2), the hit/miss determination unit 40 notifies the hit/miss counter 41 of the hit (step P3), and issues a rectangle-read request to the pre-fetch memory controller 16 (step P4).

If the rectangle-read request causes a miss with respect to the pre-fetch memory 15 (NO at step P2), on the other hand, the hit/miss determination unit 40 determines the type of miss, i.e., determines which one of an upside complete miss, an upside partial miss, a downside partial miss, and a downside complete miss corresponds to the detected miss (step P5). The hit/miss determination unit 40 then notifies the hit/miss counter 41 of the miss type (step P6), and issues a rectangle-read request to the external memory controller 12 (step P7).

Figure 6:
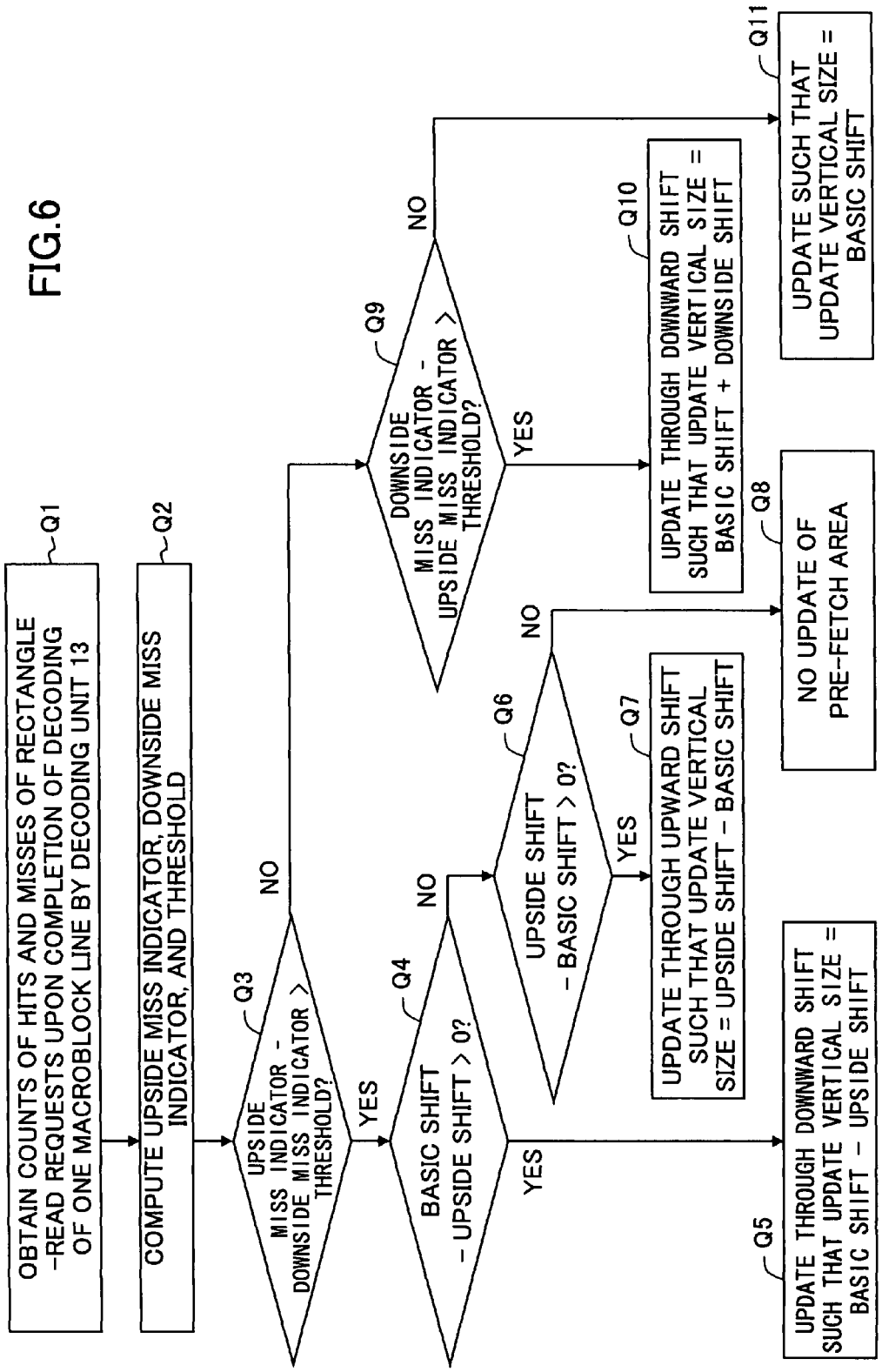
FIG. 6 is a flowchart showing the adjustment of a pre-fetch area by a pre-fetch control unit provided in the MPEG decoder that is the first embodiment of a moving-picture processing apparatus according the present invention.

FIG. 6 is a flowchart showing a pre-fetch-area adjustment performed by the pre-fetch control unit 18. FIGS. 7A through 7C are drawings for explaining the pre-fetch-area adjustment performed by the pre-fetch control unit 18. FIGS. 7A through 7C shows a decoded picture 50 stored in the external memory 11 and a pre-fetch area 51 pre-fetched in the pre-fetch memory 15. A letter designation (a) in FIGS. 7A through 7C illustrates a pre-fetch area that is used when the decoding unit 13 decodes a preceding macroblock line.

When the decoding unit 13 finishes decoding one macroblock line, the pre-fetch control unit 18 obtains the respective counts of the upside complete miss counter 42, the upside partial miss counter 43, the hit counter 44, the downside partial miss counter 45, and the downside complete miss counter 46 (step Q1).

The pre-fetch control unit 18 then computes an upside miss indicator that indicates the likelihood of misses occurring on the upside of the pre-fetch area in response to rectangle-read requests during the decoding of the preceding macroblock line by the decoding unit 13, a downside miss indicator that indicates the likelihood of misses occurring on the downside of the pre-fetch area, and a threshold for determining the vertical size of the pre-fetch area upon updating. This computation is performed by using the following formulas. In the following formulas, a1, a2, b1, b2, and c are weighting coefficients, and d is a weighting constant. The values of these coefficients and constant are adjusted as appropriate.

Upside Miss Indicator=$a1$×(the number of upside complete misses)+$b1$×(the number of upside partial misses)

Downside Miss Indicator=$a2$×(the number of downside complete misses)+$b2$×(the number of downside partial misses)

Threshold=$c$×(the number of hits)+$d$

Thereafter, the pre-fetch control unit 18 checks whether (Upside Miss Indicator−Downside Miss Indicator)>Threshold (step Q3). If (Upside Miss Indicator−Downside Miss Indicator)>Threshold (YES at step Q3), a check is made as to whether (Basic Shift−Upside Shift)>0 (step Q4). The basic shift is the vertical size for update that is used when no adjustment is made according to miss indicators, and is determined in advance (e.g., equal to the vertical size of one macroblock). The upside shift has a value that is determined based on the upside miss indicator and the downside miss indicator.

With Threshold at step Q3 being Threshold1, the upside shift may be set to one unit (e.g., 16 pixels) if Threshold1<(Upside Miss Indicator−Downside Miss Indicator)≦Treshold2. Alternatively, the upside shift may be set to two units if Threshold2<(Upside Miss Indicator−Downside Miss Indicator)≦Treshold3. Alternatively, the upside shift may be set equal to three units if Threshold3<(Upside Miss Indicator−Downside Miss Indicator).

If (Basic Shift−Upside Shift)>0 (YES at step Q4), the pre-fetch area 51 is updated (step Q5) by using an update vertical size L1 such that L1=(Basic Shift−Upside Shift) as shown in FIG. 7A-(b) in conduction with the decoding of a next macroblock line by the decoding unit 13. Namely, an area having the vertical size thereof equal to L1 is removed on the upside of the pre-fetch area 51, and an area having the vertical size thereof equal to L1 is pre-fetched on the downside of the pre-fetch area 51.

If (Basic Shift−Upside Shift)<0 (NO at step Q4), a check is made as to whether (Upside Shift−Basic Shift)>0 (step Q6). If (Upside Shift−Basic Shift)>0 (YES at step Q6), the pre-fetch area 51 is updated (step Q7) by using an update vertical size L2 such that L2=(Upside Shift−Basic Shift) as shown in FIG. 7A-(c) in conduction with the decoding of the next macroblock line by the decoding unit 13. Namely, an area having the vertical size thereof equal to L2 is removed on the downside of the pre-fetch area 51, and an area having the vertical size thereof equal to L2 is pre-fetched on the upside of the pre-fetch area 51.

If (Upside Shift−Basic Shift)<0 (NO at step Q6), i.e., if (Upside Shift−Basic Shift)=0, the pre-fetch area is not updated (step Q8) as shown in FIG. 7A-(d) while the decoding of the next macroblock line is performed by the decoding unit 13.

If (Upside Miss Indicator−Downside Miss Indicator)<Threshold (NO at step Q3), a check is made as to whether (Downside Miss Indicator−Upside Miss Indicator)>Threshold (step Q9). The threshold used in step Q9 may or may not be different from the threshold used in step Q3.

If (Downside Miss Indicator−Upside Miss Indicator)>Threshold (YES at step Q9), the pre-fetch area 51 is updated (step Q10) by using an update vertical size L3 such that L3=(Basic Shift+Downside Shift) as shown in FIG. 7B-(b) in conduction with the decoding of the next macroblock line by the decoding unit 13. Namely, an area having the vertical size thereof equal to L3 is removed on the upside of the pre-fetch area 51, and an area having the vertical size thereof equal to L3 is pre-fetched on the downside of the pre-fetch area 51.

The downside shift has a value that is determined based on the upside miss indicator and the downside miss indicator. With Threshold at step Q9 being Threshold1, the downside shift may be set equal to one unit (e.g., 16 pixels) if Threshold1<(Downside Miss Indicator−Upside Miss Indicator)≦Treshold2. Alternatively, the downside shift may be set equal to two units if Threshold2<(Downside Miss Indicator−Upside Miss Indicator)≦Treshold3. Alternatively, the downside shift may be set equal to three units if Threshold3<(Downside Miss Indicator−Upside Miss Indicator).

If (Downside Miss Indicator−Upside Miss Indicator)<Threshold (NO at step Q9), the pre-fetch area 51 is updated (step Q11) by using an update vertical size L4 such that L4=Basic Shift as shown in FIG. 7C-(b) in conduction with the decoding of the next macroblock line by the decoding unit 13. Namely, an area having the vertical size thereof equal to L4 is removed on the upside of the pre-fetch area 51, and an area having the vertical size thereof equal to L4 is pre-fetched on the downside of the pre-fetch area 51.

In the MPEG decoder that is the first embodiment of a moving-picture processing apparatus according to the present invention as described above, when the decoding unit 13 issues a rectangle-read request, the hit/miss determination unit 40 determines whether the rectangle-read request issued by the decoding unit 13 causes a hit with respect to the pre-fetch memory 15, and notifies the hit/miss counter 41 of the result of determination by indicating an upside complete miss, an upside partial miss, a hit, a downside partial miss, or a downside complete miss.

Having received the result of determination from the hit/miss determination unit 40, the hit/miss counter 41 uses the upside complete miss counter 42, the upside partial miss counter 43, the hit counter 44, the hit counter 44, the downside partial miss counter 45, and the downside complete miss counter 46 to count the number of upside complete misses, the number of upside partial misses, the number of hits, the number of downside partial misses, and the number of downside complete misses, respectively.

Further, the hit/miss determination unit 40 issues a rectangle-read request to the address generating unit 17 if the rectangle-read request issued by the decoding unit 13 causes a hit with respect to the pre-fetch memory 15. In response, the address generating unit 17 generates an address to be supplied to the pre-fetch memory 15 based on the information indicative of position and size of a rectangular portion of a decoded picture requested by the decoding unit 13 as contained in the rectangle-read request. As a result, the image data of the rectangular portion of the decoded picture requested by the decoding unit 13 is retrieved from the pre-fetch memory 15 and transferred to the decoding unit 13.

Further, the hit/miss determination unit 40 issues a rectangle-read request to the external memory controller 12 if the rectangle-read request issued by the decoding unit 13 causes a miss with respect to the pre-fetch memory 15. In response, the address generating unit 21 of the external memory controller 12 generates an address to be supplied to the external memory 11 based on the information indicative of position and size of a rectangular portion of a decoded picture requested by the decoding unit 13 as contained in the rectangle-read request. As a result, the image data of the rectangular portion of the decoded picture requested by the decoding unit 13 is retrieved from the external memory 11 and transferred to the decoding unit 13.

Moreover, the pre-fetch control unit 18 starts updating from the left-hand side of the pre-fetched area each time the decoding unit 13 finishes decoding for one macroblock line. In this case, the position and vertical size of a pre-fetch area will be adjusted as shown in FIG. 6 by controlling the information indicative of position and size of a rectangle portion contained in a pre-fetch data updating request based on the number of hits and the numbers of misses for respective miss types counted by the hit/miss counter 41 according to the rectangle-read requests issued by the decoding unit 13 during the decoding of the preceding macroblock line.

In the MPEG decoder 10 that is the first embodiment of a moving-picture processing apparatus according to the present invention as described above, the hit/miss-determination-&-count unit 14 and the pre-fetch control unit 18 analyze the directions of misses occurring with respect to the pre-fetch memory 15 in response to rectangle-read requests issued from the decoding unit 13, and adjust a pre-fetch area pre-fetched by the pre-fetch memory 15 such as to reduce the number of misses occurring with respect to the pre-fetch memory 15 in response to rectangle-read requests issued from the decoding unit 13. The hit rate of rectangle-read requests issued by the decoding unit 13 with respect to the pre-fetch memory 15 is thus improved, thereby increasing the processing speed of decoding by the decoding unit 13.

The MPEG decoder 10 that is the first embodiment of a moving-picture processing apparatus according to the present invention is configured such that the hit/miss-determination-&-count unit 14 counts the number of hits and the numbers of misses with respect to respective types of misses. Alternatively, provision may be made such that the hit/miss-determination-&-count unit 14 counts the area size of hits and the area sizes of misses with respect to respective types of misses.

In this case, the pre-fetch control unit 18 computes the upside miss indicator as first weighting coefficient×the total area size of rectangular portions of upside complete misses+second weighting coefficient×the total area size of overlapping portions between the rectangular portions of upside partial misses and the non-pre-fetch area. Further, the pre-fetch control unit 18 computes the downside miss indicator as third weighting coefficient×the total area size of rectangular portions of downside complete misses+fourth weighting coefficient×the total area size of overlapping portions between the rectangular portions of downside partial misses and the non-pre-fetch area.

If (Upside Miss Indicator−Downside Miss Indicator)>Threshold, the pre-fetch area is adjusted such that the update vertical size is equal to Basic Shift−Upside Shift. If (Downside Miss Indicator−Upside Miss Indicator)>Threshold, the pre-fetch area is adjusted such that the update vertical size is equal to Basic Shift+Downside Shift. If (Upside Miss Indicator−Downside Miss Indicator)≦Threshold and (Downside Miss Indicator−Upside Miss Indicator)≦Threshold, the pre-fetch area is adjusted such that the update vertical size is equal to Basic Shift.

Alternatively, the hit/miss-determination-&-count unit 14 may be configured to count the number of upside misses and the number of downside misses separately, such that an upside miss is detected when a rectangle-read request causes a miss by requesting a position above the pre-fetch area, and such that a downside miss is detected when a rectangle-read request causes a miss by requesting a position below the pre-fetch area.

In this case, the pre-fetch control unit 18 computes the upside miss indicator as a first weighting coefficient×the number of upside misses, and computes the downside miss indicator as a second weighting coefficient×the number of downside misses. If (Upside Miss Indicator−Downside Miss Indicator)>Threshold, the pre-fetch area is adjusted such that the update vertical size is equal to Basic Shift−Upside Shift. If (Downside Miss Indicator−Upside Miss Indicator)>Threshold, the pre-fetch area is adjusted such that the update vertical size is equal to Basic Shift+Downside Shift. If (Upside Miss Indicator−Downside Miss Indicator)≦Threshold and (Downside Miss Indicator−Upside Miss Indicator)≦Threshold, the pre-fetch area is adjusted such that the update vertical size is equal to Basic Shift.

Alternatively, the hit/miss-determination-&-count unit 14 may be configured to separately count the area size of rectangular portions of upside misses and the area size of the rectangular portions of downside misses, such that an upside miss is detected when a rectangle-read request causes a miss by requesting a position above the pre-fetch area, and such that a downside miss is detected when a rectangle-read request causes a miss by requesting a position below the pre-fetch area.

In this case, the pre-fetch control unit 18 computes the upside miss indicator as a first weighting coefficient×the area size of relevant rectangular portions of upside misses, and computes the downside miss indicator as a second weighting coefficient×the area size of relevant rectangular portions of downside misses. If (Upside Miss Indicator−Downside Miss Indicator)>Threshold, the pre-fetch area is adjusted such that the update vertical size is equal to Basic Shift−Upside Shift. If (Downside Miss Indicator−Upside Miss Indicator)>Threshold, the pre-fetch area is adjusted such that the update vertical size is equal to Basic Shift+Downside Shift. If (Upside Miss Indicator−Downside Miss Indicator)≦Threshold and (Downside Miss Indicator−Upside Miss Indicator)<Threshold, the pre-fetch area is adjusted such that the update vertical size is equal to Basic Shift.

Second Embodiment of Moving-Picture Processing Apparatus

Figure 8:
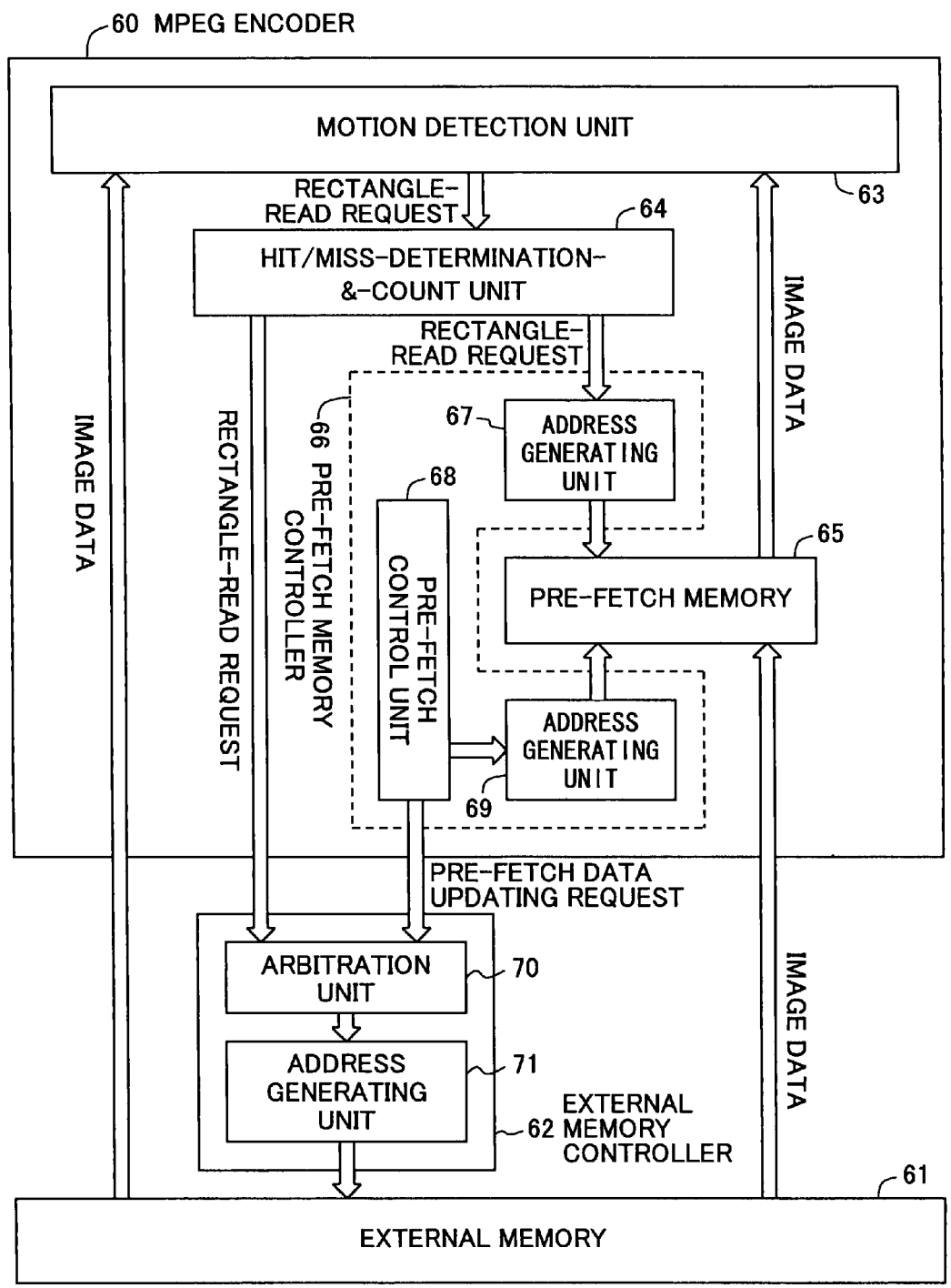
FIG. 8 is a drawing showing an MPEG encoder that is a second embodiment of a moving-picture processing apparatus according the present invention together with an external memory and an external memory controller.

FIG. 8 is a drawing showing an MPEG encoder that is a second embodiment of a moving-picture processing apparatus according the present invention together with an external memory and an external memory controller. In FIG. 8, an MPEG encoder 60 that is the second embodiment of a moving-picture processing apparatus according to the present invention compresses and encodes an image signal to generate an MPEG stream. An external memory 61 serves to store a decoded picture that is used by the MPEG encoder 60 to obtain a reference image. An external memory controller 62 controls the reading of a reference image from the external memory 61.

The MPEG encoder 60 that is the second embodiment of a moving-picture processing apparatus according to the present invention includes a motion detection unit 63, a hit/miss-determination-&-count unit 64, a pre-fetch memory 65, and a pre-fetch memory controller 66.

The motion detection unit 63 performs motion detection necessary to generate an MPEG stream. The motion detection unit 63 issues a rectangle-read request to the hit/miss-determination-&-count unit 64 when the motion detection unit 63 uses, as a reference image, a rectangular portion of a decoded picture stored in the external memory 61.

The hit/miss-determination-&-count unit 64 determines whether a rectangle-read request issued by the hit/miss-determination-&-count unit 64 causes a hit with respect to the pre-fetch memory 65, i.e., whether the rectangular portion of the decoded picture requested by the rectangle-read request is present in the pre-fetch memory 65, and also counts the number of misses with respect to respective types of misses as will later be described. The hit/miss-determination-&-count unit 64 issues a rectangle-read request to the pre-fetch memory 65 in the case of a hit. In the case of a miss, the hit/miss-determination-&-count unit 64 issues a rectangle-read request to the external memory controller 62.

The pre-fetch memory 65 serves to pre-fetch and store a portion of a decoded picture stored in the external memory 61. The pre-fetch memory controller 66 serves to control the reading of image data from the pre-fetch memory 65 and the updating of pre-fetched data, and includes an address generating unit 67, a pre-fetch control unit 68, and an address generating unit 69.

The address generating unit 67 receives a rectangle-read request issued from the hit/miss-determination-&-count unit 64, and generates an address based on the information indicative of position and size of a rectangle portion contained in the rectangle-read request. The generated address is supplied to the pre-fetch memory 65.

Each time the motion detection unit 63 detects motion with respect to one macroblock, the pre-fetch control unit 68 generates a pre-fetch data updating request for provision to the external memory controller 62 and to the address generating unit 69 for the purpose of shifting a pre-fetch area pre-fetched in the pre-fetch memory 65. The pre-fetch data updating request includes information indicative of a shift direction and shift amount of a pre-fetch area.

The pre-fetch control unit 68 shifts the pre-fetch area each time the motion detection unit 63 finishes detecting motion for one macroblock. In doing so, the shift direction and shift amount of the pre-fetch area is adjusted based on the pre-fetch data updating request according to need.

The address generating unit 69 receives a pre-fetch data updating request from the pre-fetch control unit 68, and generates an address based on the information indicative of a shift direction and shift amount of a pre-fetch area contained in the pre-fetch data updating request. The generated address is supplied to the pre-fetch memory 65. Upon receiving the address from the address generating unit 69, the pre-fetch memory 65 updates the pre-fetch area by storing image data that is simultaneously transferred from the external memory 61.

The external memory controller 62 includes an arbitration unit 70 and an address generating unit 71. The arbitration unit 70 serves to arbitrate between a rectangle-read request issued by the hit/miss-determination-&-count unit 64 and a pre-fetch data updating request issued by the pre-fetch control unit 68 in terms of which is to be transferred to the address generating unit 71.

Upon receiving a rectangle-read request from the hit/miss-determination-&-count unit 64 via the arbitration unit 70, the address generating unit 71 generates an address to be supplied to the external memory 61 based on the information indicative of position, direction, and size of a pre-fetch area contained in the rectangle-read request. Upon receiving a pre-fetch data updating request from the pre-fetch control unit 68 via the arbitration unit 70, the address generating unit 71 generates an address to be supplied to the external memory 61 based on the information indicative of a shift direction and shift amount of a pre-fetch area to be pre-fetched as contained in the pre-fetch data updating request.

Image data retrieved from the external memory 61 in response to a rectangle-read request from the hit/miss-determination-&-count unit 64 is transferred to the motion detection unit 63. Image data retrieved from the external memory 61 in response to a pre-fetch data updating request from the pre-fetch control unit 68 is transferred to the pre-fetch memory 65.

FIGS. 9A through 9F are drawings showing an example of transitions of a pre-fetch area in a decoded picture stored in the external memory 61 as pre-fetched by the pre-fetch memory 65 under the control of the pre-fetch control unit 68. This example shows a case in which the shift direction and shift amount of a pre-fetch area are not adjusted. FIGS. 9A through 9F show a decoded picture 75 stored in the external memory 61 and a pre-fetch area 76 pre-fetched to the pre-fetch memory 65.

Figure 9B:
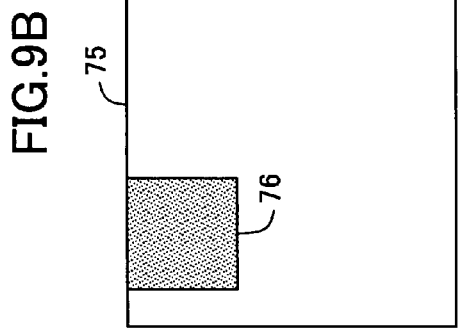

In the MPEG encoder 60 that is the second embodiment of a moving-picture processing apparatus according to the present invention, pre-fetching starts with a predetermined vertical size from the top-left corner of the decoded picture 75. The pre-fetch memory 65 is filled with image data at the timing shown in FIG. 9A. As the motion detection unit 63 finishes detecting motion for one macroblock, the pre-fetch area 76 is shifted to the right by a basic shift amount as shown in FIG. 9B. Thereafter, the pre-fetch area 76 is successively shifted to the right by an increment of the basic shift amount to keep pace with the motion detection of a successive macroblock performed by the motion detection unit 63.

Figure 9C:
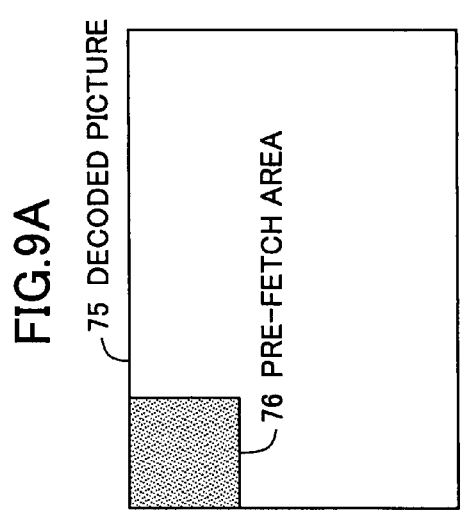
Figure 9D:
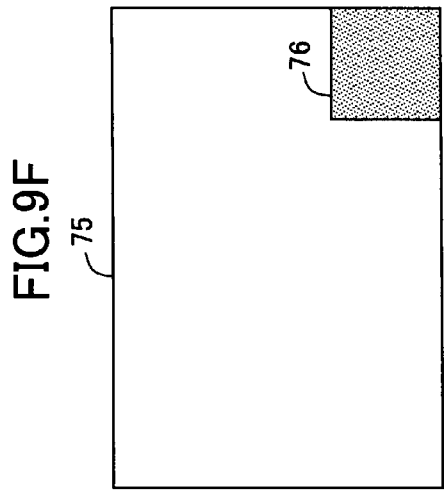
Figure 9E:
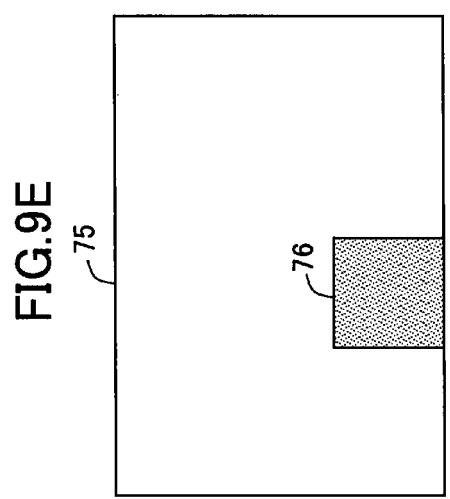
Figure 9F:
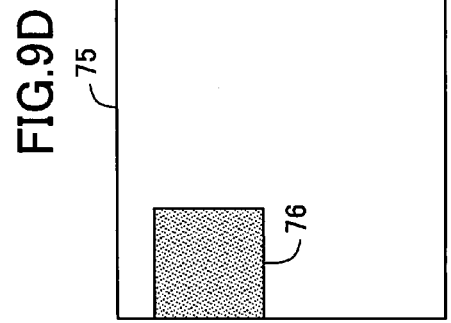

When the pre-fetch area 76 reaches the right-hand-side edge of the decoded picture 75 as shown in FIG. 9C, the pre-fetch area 76 is shifted downward by a basic shift amount as shown in FIG. 9D, and then continues to be shifted to the right. Such shifting of the pre-fetch area 76 continues as shown in FIGS. 9D and 9E. When the pre-fetch area 76 reaches the bottom-right corner of the decoded picture 75 as shown in FIG. 9F, the shifting of the pre-fetch area 76 comes to an end.

In the MPEG encoder 60 that is the second embodiment of a moving-picture processing apparatus according to the present invention, the shift direction and shift amount of the pre-fetch area 76 are adjusted according to the manner in which misses occur with respect to the pre-fetch memory 65 in response to rectangle-read requests issued by the motion detection unit 63, which will later be described.

In the MPEG encoder 60 that is the second embodiment of a moving-picture processing apparatus according to the present invention, the type of miss is classified into eight miss types, i.e., "upside complete miss", "upside partial miss", "downside complete miss", "downside partial miss", "left-hand-side complete miss", "left-hand-side partial miss", "right-hand-side complete miss", and "right-hand-side partial miss".

Table 2 and Table 3 show the definitions of "upside complete miss", "upside partial miss", "downside complete miss", "downside partial miss", "left-hand-side complete miss", "left-hand-side partial miss", "right-hand-side complete miss", and "right-hand-side partial miss" that are used in the MPEG encoder 60 that is the second embodiment of a moving-picture processing apparatus according the present invention.

TABLE 2

| | |
|---|---|
| Upside Complete Miss: | The entirety of a rectangular portion of a decoded picture requested by the motion detection unit 63 is fully included in a non-pre-fetch area situated above any one of a non-pre-fetch area situated on the left of the pre-fetch area, the pre-fetch area, and a non-pre-fetch area situated on the right of the pre-fetch area. |
| Upside Partial Miss: | The rectangular portion of a decoded picture requested by the motion detection unit 63 straddles the border between a non-pre-fetch area situated above any one of a non-pre-fetch area situated on the left of the pre-fetch area, the pre-fetch area, and a non-pre-fetch area situated on the right of the pre-fetch area and any one of the non-pre-fetch area situated on the left of the pre-fetch area, the pre-fetch area, and the non-pre-fetch area situated on the right of the pre-fetch area. |
| Downside Complete Miss: | The entirety of a rectangular portion of a decoded picture requested by the motion detection unit 63 is fully included in a non-pre-fetch area situated below any one of a non-pre-fetch area situated on the left of the pre-fetch area, the pre-fetch area, and a non-pre-fetch area situated on the right of the pre-fetch area. |
| Downside Partial Miss: | The rectangular portion of a decoded picture requested by the motion detection unit 63 straddles the border between a non-pre-fetch area situated below any one of a non-pre-fetch area situated on the left of the pre-fetch area, the pre-fetch area, and a non-pre-fetch area situated on the right of the pre-fetch area and any one of the non-pre-fetch area situated on the left of the pre-fetch area, the pre-fetch area, and the non-pre-fetch area situated on the right of the pre-fetch area. |

TABLE 3

| | |
|---|---|
| Left-Hand-Side Complete Miss: | The entirety of a rectangular portion of a decoded picture requested by the motion detection unit 63 is fully included in a non-pre-fetch area situated on the left of any one of a non-pre-fetch area situated above the pre-fetch area, the pre-fetch area, and a non-pre-fetch area situated below the pre-fetch area. |
| Left-Hand-Side Partial Miss: | The rectangular portion of a decoded picture requested by the motion detection unit 63 straddles the border between a non-pre-fetch area situated on the left of any one of a non-pre-fetch area situated above the pre-fetch area, the pre-fetch area, and a non-pre-fetch area situated below the pre-fetch area and any one of the non-pre-fetch area situated above the pre-fetch area, the pre-fetch area, and the non-pre-fetch area situated below the pre-fetch area. |
| Right-Hand-Side Complete Miss: | The entirety of a rectangular portion of a decoded picture requested by the motion detection unit 63 is fully included in a non-pre-fetch area situated on the right of any one of a non-pre-fetch area situated above the pre-fetch area, the pre-fetch area, and a non-pre-fetch area situated below the pre-fetch area. |
| Right-Hand-Side Partial Miss: | The rectangular portion of a decoded picture requested by the motion detection unit 63 straddles the border between a non-pre-fetch area situated on the right of any one of a non-pre-fetch area situated above the pre-fetch area, the pre-fetch area, and a non-pre-fetch area situated below the pre-fetch area and any one of the non-pre-fetch area situated above the pre-fetch area, the pre-fetch area, and the non-pre-fetch area situated below the pre-fetch area. |
| Hit: | The entirety of a rectangular portion of a decoded picture requested by the motion detection unit 63 is fully included in the pre-fetch area. |

Figure 10:
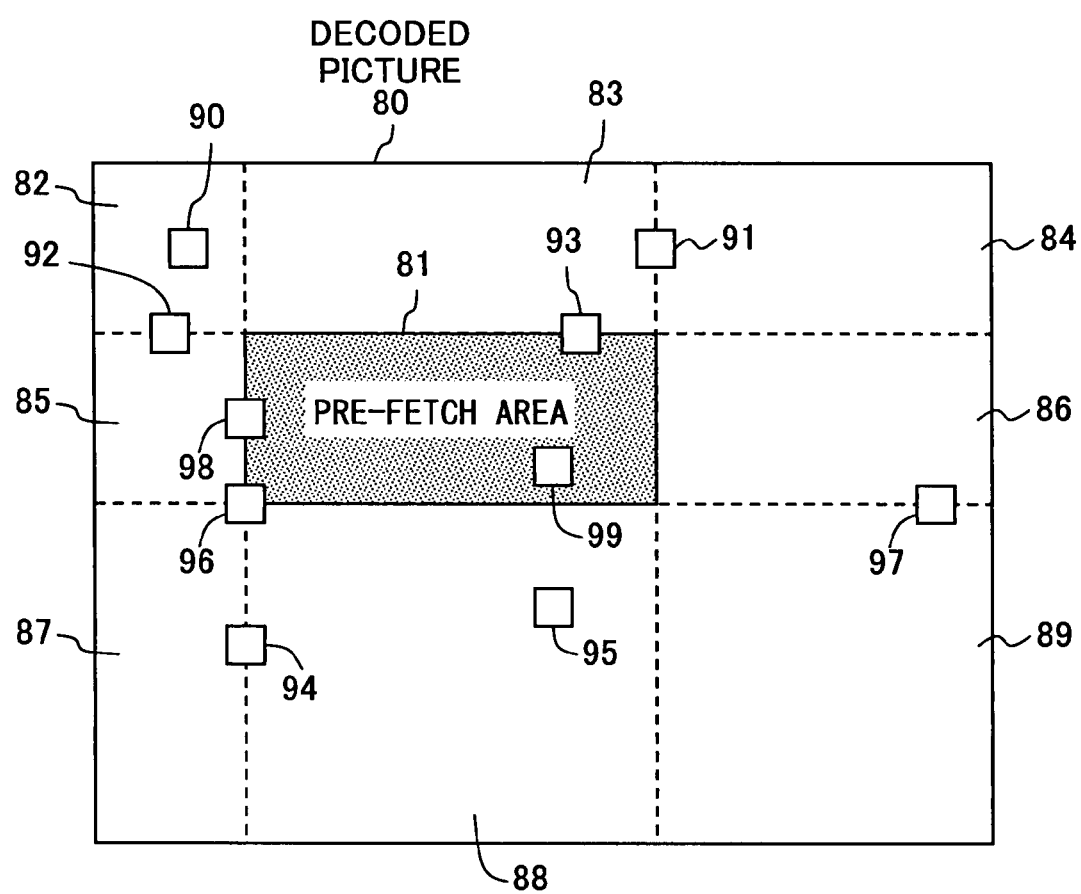
FIG. 10 is a drawing for explaining specific examples of miss types used in the MPEG encoder that is the second embodiment of a moving-picture processing apparatus according the present invention.

FIG. 10 is a drawing for explaining specific examples of the miss types. FIG. 10 shows a decoded picture 80 stored in the external memory 61, a pre-fetch area 81 pre-fetched in the pre-fetch memory 65, and non-pre-fetch areas 82 through 89 that are not pre-fetched in the pre-fetch memory 65.

The upside complete miss refers to the case in which the entirety of a rectangular portion of the decoded picture 80 requested by the motion detection unit 63 is fully included in the non-pre-fetch areas 82 through 84 situated above any one of the non-pre-fetch area 85 situated on the left of the pre-fetch area 81, the pre-fetch area 81, and the non-pre-fetch area 86 situated on the right of the pre-fetch area 81, as are rectangular portions 90 and 91.

The upside partial miss refers to the case in which the rectangular portion of the decoded picture 80 requested by the motion detection unit 63 straddles the border between the non-pre-fetch areas 82 through 84 situated above any one of the non-pre-fetch area 85 situated on the left of the pre-fetch area 81, the pre-fetch area 81, and the non-pre-fetch area 86 situated on the right of the pre-fetch area 81 and any one of the non-pre-fetch area 85 situated on the left of the pre-fetch area 81, the pre-fetch area 81, and the non-pre-fetch area 86 situated on the right of the pre-fetch area 81, as are rectangular portions 92 and 93, for example.

The downside complete miss refers to the case in which the entirety of a rectangular portion of the decoded picture 80 requested by the motion detection unit 63 is fully included in the non-pre-fetch areas 87 through 89 situated below any one of the non-pre-fetch area 85 situated on the left of the pre-fetch area 81, the pre-fetch area 81, and the non-pre-fetch area 86 situated on the right of the pre-fetch area 81, as are rectangular portions 94 and 95.

The downside partial miss refers to the case in which the rectangular portion of the decoded picture 80 requested by the motion detection unit 63 straddles the border between the non-pre-fetch areas 87 through 89 situated below any one of the non-pre-fetch area 85 situated on the left of the pre-fetch area 81, the pre-fetch area 81, and the non-pre-fetch area 86 situated on the right of the pre-fetch area 81 and any one of the non-pre-fetch area 85 situated on the left of the pre-fetch area 81, the pre-fetch area 81, and the non-pre-fetch area 86 situated on the right of the pre-fetch area 81, as are rectangular portions 96 and 97, for example.

The left-hand-side complete miss refers to the case in which the entirety of a rectangular portion of the decoded picture 80 requested by the motion detection unit 63 is fully included in the non-pre-fetch areas 82, 85, and 87 situated on the left of any one of the non-pre-fetch area 83 situated above the pre-fetch area 81, the pre-fetch area 81, and the non-pre-fetch area 88 situated below the pre-fetch area 81, as are the rectangular portions 90 and 92.

The left-hand-side partial miss refers to the case in which the rectangular portion of the decoded picture 80 requested by the motion detection unit 63 straddles the border between the non-pre-fetch areas 82, 85, and 87 situated on the left of any one of the non-pre-fetch area 83 situated above the pre-fetch area 81, the pre-fetch area 81, and the non-pre-fetch area 88 situated below the pre-fetch area 81 and any one of the non-pre-fetch area 83 situated above the pre-fetch area 81, the pre-fetch area 81, and the non-pre-fetch area 88 situated below the pre-fetch area 81, as are the rectangular portions 94, 96, and 98, for example.

The right-hand-side complete miss refers to the case in which the entirety of a rectangular portion of the decoded picture 80 requested by the motion detection unit 63 is fully included in the non-pre-fetch areas 84, 86, and 89 situated on the right of any one of the non-pre-fetch area 83 situated above the pre-fetch area 81, the pre-fetch area 81, and the non-pre-fetch area 88 situated below the pre-fetch area 81, as is the rectangular portion 97.

The right-hand-side partial miss refers to the case in which the rectangular portion of the decoded picture 80 requested by the motion detection unit 63 straddles the border between the non-pre-fetch areas 84, 86, and 89 situated on the right of any one of the non-pre-fetch area 83 situated above the pre-fetch area 81, the pre-fetch area 81, and the non-pre-fetch area 88 situated below the pre-fetch area 81 and any one of the non-pre-fetch area 83 situated above the pre-fetch area 81, the pre-fetch area 81, and the non-pre-fetch area 88 situated below the pre-fetch area 81, as is the rectangular portion 91, for example.

The hit refers to the case in which the entirety of a rectangular portion of the decoded picture 80 requested by the motion detection unit 63 is fully included in the pre-fetch area 81 as is a rectangular portion 99.

Figure 11:
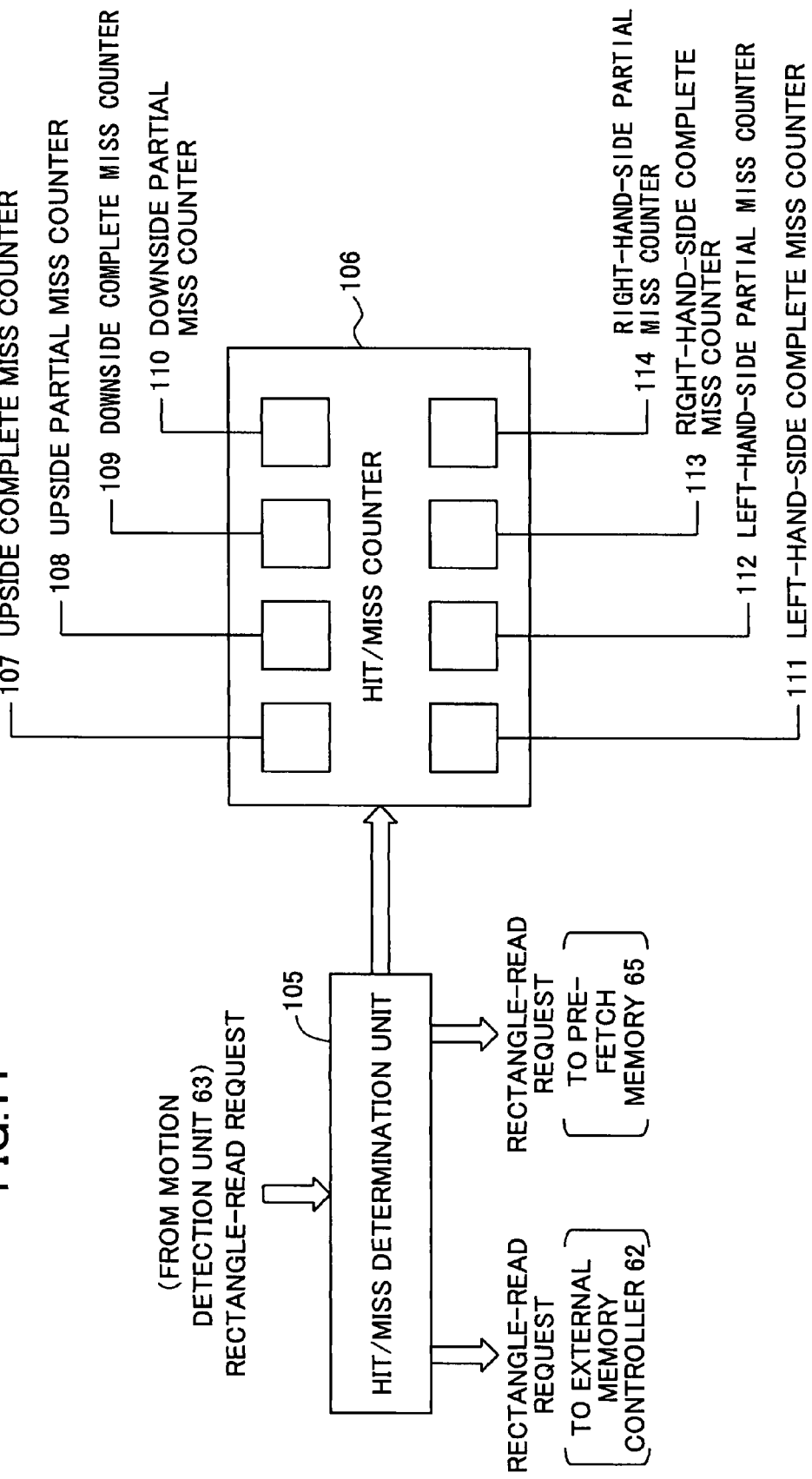
FIG. 11 is a block diagram showing a hit/miss-determination-&-count unit provided in the MPEG encoder that is the second embodiment of a moving-picture processing apparatus according the present invention.

FIG. 11 is a block diagram showing the hit/miss-determination-&-count unit 64. The hit/miss-determination-&-count unit 64 includes a hit/miss determination unit 105 and a hit/miss counter 106.

The hit/miss determination unit 105 determines whether a rectangle-read request issued by the motion detection unit 63 causes a hit with respect to the pre-fetch memory 65, and notifies the hit/miss counter 106 of the result of determination in the case of a miss by indicating an upside complete miss, an upside partial miss, a downside complete miss, a downside partial miss, left-hand-side complete miss, a left-hand-side partial miss, a right-hand-side complete miss, or a right-hand-side partial miss. Further, the hit/miss determination unit 105 issues a rectangle-read request to the pre-fetch memory 65 in the case of a hit, and issues a rectangle-read request to the external memory controller 62 in the case of a miss.

The hit/miss counter 106 includes a an upside complete miss counter 107, an upside partial miss counter 108, a downside complete miss counter 109, a downside partial miss counter 110, a left-hand-side complete miss counter 111, a left-hand-side partial miss counter 112, a right-hand-side complete miss counter 113, and a right-hand-side partial miss counter 114.

The upside complete miss counter 107 counts the number of upside complete misses. The upside partial miss counter 108 counts the number of upside partial misses. The downside complete miss counter 109 counts the number of downside complete misses. The downside partial miss counter 110 counts the number of downside partial misses.

The left-hand-side complete miss counter 111 counts the number of left-hand-side complete misses. The left-hand-side partial miss counter 112 counts the number of left-hand-side partial misses. The right-hand-side complete miss counter 113 counts the number of right-hand-side complete misses. The right-hand-side partial miss counter 114 counts the number of right-hand-side partial misses.

In the case of the MPEG encoder 60 that is the second embodiment of a moving-picture processing apparatus according to the present invention, a single rectangle-read request issued by the motion detection unit 63 may fall into the categories of multiple miss types. In such a case, the hit/miss determination unit 105 notifies of all the relevant miss types, and the hit/miss counter 106 counts the numbers of misses by use of the respective relevant counters.

In the example shown in FIG. 10, the rectangle-read request requesting the rectangular portion 91 falls under the categories of an upside complete miss and a right-hand-side partial miss, and the rectangle-read request requesting the rectangular portion 92 falls under the categories of an upside partial miss and a left-hand-side complete miss. The rectangle-read request requesting the rectangular portion 94 falls under the categories of a downside complete miss and a left-hand-side partial miss. The rectangle-read request requesting the rectangular portion 96 falls under the categories of a downside partial miss and a left-hand-side partial miss. The rectangle-read request requesting the rectangular portion 97 falls under the categories of a downside partial miss and a right-hand-side complete miss. In this manner, each of them is counted twice.

Figure 12:
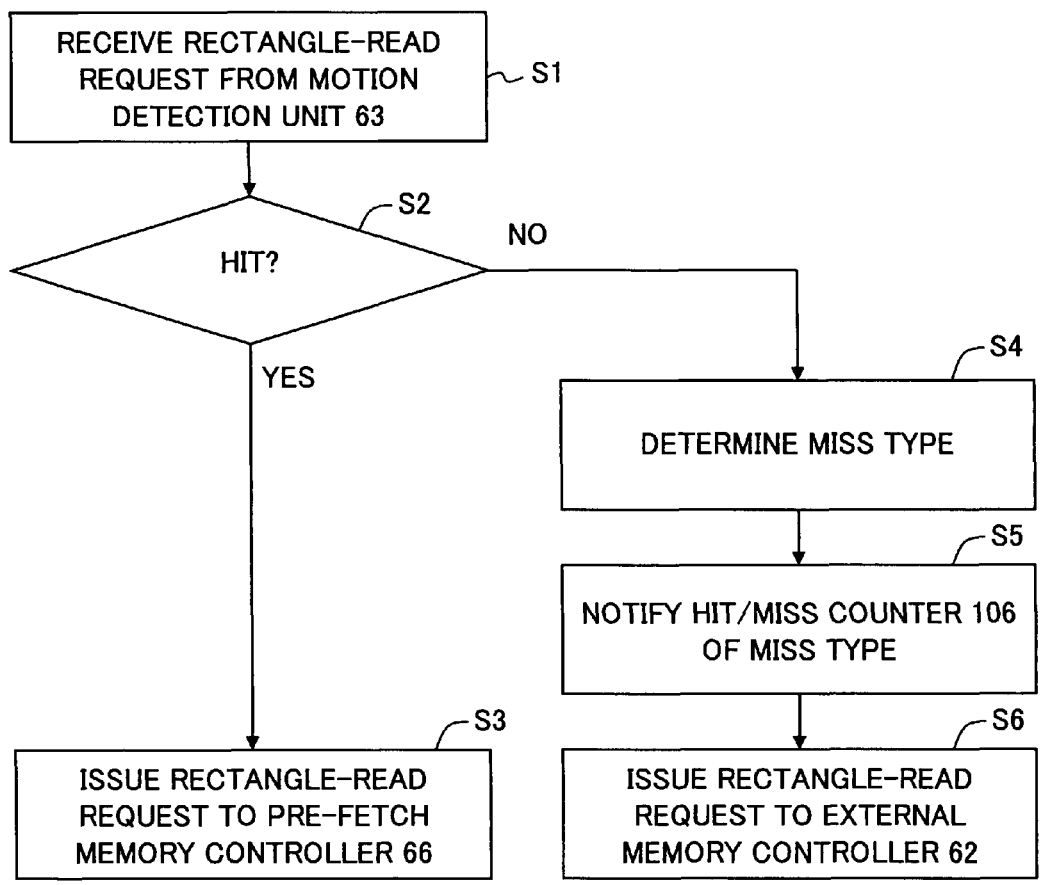
FIG. 12 is a flowchart showing the operation of a hit/miss determination unit provided in the MPEG encoder that is the second embodiment of a moving-picture processing apparatus according the present invention.

FIG. 12 is a flowchart showing the operation of the hit/miss determination unit 105. The hit/miss determination unit 105 receives a rectangle-read request from the motion detection unit 63 (step S1), and determines whether the rectangle-read request causes a hit with respect to the pre-fetch memory 65 (step S2). In the case of a hit (YES at step S2), the hit/miss determination unit 40 issues a rectangle-read request to the pre-fetch memory controller 66 (step S3).

If the rectangle-read request causes a miss with respect to the pre-fetch memory 65 (NO at step S2), on the other hand, the hit/miss determination unit 105 determines the type of miss, i.e., determines which one of an upside complete miss, an upside partial miss, a downside complete miss, a downside partial miss, left-hand-side complete miss, a left-hand-side partial miss, a right-hand-side complete miss, and a right-hand-side partial miss corresponds to the detected miss (step S4). The hit/miss determination unit 105 then notifies the hit/miss counter 106 of the miss type (step S5), and issues a rectangle-read request to the external memory controller 62 (step S6).

FIG. 13 is a flowchart showing a pre-fetch-area adjustment performed by the pre-fetch control unit 68. When the motion detection unit 63 finishes processing one macroblock, the pre-fetch control unit 68 computes an upside miss indicator that indicates the likelihood of misses occurring on the upside of the pre-fetch area in response to rectangle-read requests during the processing of the preceding macroblock by the motion detection unit 63, a downside miss indicator that indicates the likelihood of misses occurring on the downside of the pre-fetch area, a left-hand-side miss indicator that indicates the likelihood of misses occurring on the left of the pre-fetch area, and a right-hand-side miss indicator that indicates the likelihood of misses occurring on the right of the pre-fetch area. This computation is performed by using the values of the counters 107 through 114 of the hit/miss counter 106 and the following formulas (step W1). In the following formulas, a3 through a6 and b3 through b6 are weighting coefficients. The values of these coefficients are adjusted as appropriate.

Upside Miss Indicator=$a3\times$(the number of upside complete misses)+$b3\times$(the number of upside partial misses)

Downside Miss Indicator=$a4\times$(the number of downside complete misses)+$b4\times$(the number of downside partial misses)

Left-Hand-Side Miss Indicator=$a5\times$(the number of left-hand-side complete misses)+$b5\times$(the number of left-hand-side partial misses)

Right-Hand-Side Miss Indicator=$a6\times$(the number of right-hand-side complete misses)+$b6\times$(the number of right-hand-side partial misses)

The pre-fetch control unit 68 then determines the direction in which the miss indicator is the largest (step W2). If the upside miss indicator is the largest, an upside shift is computed based on the upside miss indicator for the purpose of adjusting the position of the pre-fetch area (step W3). The upside shift is computed such that Upside Shift=(K1×Upside Miss Indicator+N1), for example. Here, K1 is a weighting coefficient, and N1 is a weighting constant. The values of K1 and N1 are adjusted as appropriate. The pre-fetch area is then shifted to the right by a basic shift amount and shifted upward by Upside Shift (step W4).

If it is found at step W2 that the downside miss indicator is the largest, a downside shift is computed based on the downside miss indicator for the purpose of adjusting the position of the pre-fetch area (step W5). The downside shift is computed such that Downside Shift=(K2×Downside Miss Indicator+N2), for example. Here, K2 is a weighting coefficient, and N2 is a weighting constant. The values of K2 and N2 are adjusted as appropriate. The pre-fetch area is then shifted to the right by the basic shift amount and shifted downward by Downside Shift (step W6).

If it is found at step W2 that the left-hand-side miss indicator is the largest, a left-hand-side shift is computed based on the left-hand-side miss indicator for the purpose of adjusting the position of the pre-fetch area (step W7). The left-hand-side shift is computed such that Left-Hand-Side Shift=(K3×Left-Hand-Side Miss Indicator+N3), for example. Here, K3 is a weighting coefficient, and N3 is a weighting constant. The values of K3 and N3 are adjusted as appropriate. The pre-fetch area is then shifted to the right by the basic shift amount and shifted to the left by Left-Hand-Side Shift (step W8).

If it is found at step W2 that the right-hand-side miss indicator is the largest, a right-hand-side shift is computed based on the right-hand-side miss indicator for the purpose of adjusting the position of the pre-fetch area (step W9). The right-hand-side shift is computed such that Right-Hand-Side Shift=(K4×Right-Hand-Side Miss Indicator+N4), for example. Here, K4 is a weighting coefficient, and N4 is a weighting constant. The values of K4 and N4 are adjusted as appropriate. The pre-fetch area is then shifted to the right by the basic shift amount and further shifted to the right by Right-Hand-Side Shift (step W10).

If it is found at step W2 that there is no miss, the pre-fetch area is shifted as usual such that the shift amount is equal to the basic shift amount (step W11).

FIGS. 14A through 14F are drawings showing an example of transitions of a pre-fetch area in a decoded picture stored in the external memory 61 as pre-fetched by the pre-fetch memory 65 under the control of the pre-fetch control unit 68. FIGS. 14A through 14F show a decoded picture 120 stored in the external memory 61 and a pre-fetch area 121 pre-fetched in the pre-fetch memory 65.

FIG. 14A shows the pre-fetch area 121 at a certain instant. FIG. 14B shows a case in which only hits are detected as a result of the determination of the direction in which the miss indicator is the largest when such determination is made by the pre-fetch control unit 68 based on the number of misses with respect to the pre-fetch area 121 shown in FIG. 14A. In this case, the pre-fetch area 121 shown in FIG. 14A is shifted to the right by the basic shift amount as shown in FIG. 14B.

FIG. 14C shows a case in which a downside shift amount is determined to be two units as a result of the computation of a shift amount performed by the pre-fetch control unit 68 based on the number of misses with respect to the pre-fetch area 121 shown in FIG. 14B. In this case, the pre-fetch area 121 shown in FIG. 14B is shifted to the right by the basic shift amount and shifted downward by two units as shown in FIG. 14C. The size of one unit as a shift unit is a matter of design choice.

FIG. 14D shows a case in which a right-hand-side shift amount is determined to be one unit as a result of the computation of a shift amount performed by the pre-fetch control unit 68 based on the number of misses with respect to the pre-fetch area 121 shown in FIG. 14C. In this case, the pre-fetch area 121 shown in FIG. 14C is shifted to the right by the basic shift amount and further shifted to the right by one unit as shown in FIG. 14D.

FIG. 14E shows a case in which an upside shift amount is determined to be one unit as a result of the computation of a shift amount performed by the pre-fetch control unit 68 based on the number of misses with respect to the pre-fetch area 121 shown in FIG. 14D. In this case, the pre-fetch area 121 shown in FIG. 14D is shifted to the right by the basic shift amount and shifted upward by one unit as shown in FIG. 14E.

FIG. 14F shows a case in which a shift amount is determined to be zero as a result of the computation of a shift amount performed by the pre-fetch control unit 68 based on the number of misses with respect to the pre-fetch area 121 shown in FIG. 14E. In this case, the pre-fetch area 121 shown in FIG. 14E is shifted to the right by the basic shift amount as shown in FIG. 14F.

In the MPEG encoder that is the second embodiment of a moving-picture processing apparatus according to the present invention as described above, when the motion detection unit 63 issues a rectangle-read request, the hit/miss determination unit 105 determines whether the rectangle-read request issued by the motion detection unit 63 causes a hit with respect to the pre-fetch memory 65, and notifies the hit/miss counter 106 of the result of determination only in the case of a miss by indicating an upside complete miss, an upside partial miss, a downside complete miss, a downside partial miss, left-hand-side complete miss, a left-hand-side partial miss, a right-hand-side complete miss, and a right-hand-side partial miss.

Having received the result of determination from the hit/miss determination unit 105, the hit/miss counter 106 uses the upside complete miss counter 107, the upside partial miss counter 108, the downside complete miss counter 109, the downside partial miss counter 110, the left-hand-side complete miss counter 111, the left-hand-side partial miss counter 112, the right-hand-side complete miss counter 113, and the right-hand-side partial miss counter 114 to count the number of upside complete misses, the number of upside partial misses, the number of downside complete misses, the number of downside partial misses, the number of left-hand-side complete misses, the number of left-hand-side partial misses, the number of right-hand-side complete misses, the number of right-hand-side partial misses, respectively.

Further, the hit/miss determination unit 105 issues a rectangle-read request to the address generating unit 67 if the rectangle-read request issued by the motion detection unit 63 causes a hit with respect to the pre-fetch memory 65. In response, the address generating unit 67 generates an address to be supplied to the pre-fetch memory 65 based on the information indicative of position and size of a rectangular portion of a decoded picture requested by the motion detection unit 63 as contained in the rectangle-read request. As a result, the image data of the rectangular portion of the decoded picture requested by the motion detection unit 63 is retrieved from the pre-fetch memory 65 and transferred to the motion detection unit 63.

Further, the hit/miss determination unit 105 issues a rectangle-read request to the external memory controller 62 if the rectangle-read request issued by the motion detection unit 63 causes a miss with respect to the pre-fetch memory 65. In response, the address generating unit 71 of the external memory controller 62 generates an address to be supplied to the external memory 61 based on the information indicative of position and size of a rectangular portion of a decoded picture requested by the motion detection unit 63 as contained in the rectangle-read request. As a result, the image data of the rectangular portion of the decoded picture requested by the motion detection unit 63 is retrieved from the external memory 61 and transferred to the motion detection unit 63.

The pre-fetch control unit 68 shifts the pre-fetch area each time the motion detection unit 63 finishes processing one macroblock. In doing so, the shift direction and shift amount of the pre-fetch area is adjusted as shown in FIG. 13.

In the MPEG encoder 60 that is the second embodiment of a moving-picture processing apparatus according to the present invention as described above, the hit/miss-determination-&-count unit 64 and the pre-fetch control unit 68 analyze the directions of misses occurring with respect to the pre-fetch memory 65 in response to rectangle-read requests issued from the motion detection unit 63, and adjust a pre-fetch area pre-fetched by the pre-fetch memory 65 such as to reduce the number of misses occurring with respect to the pre-fetch memory 65 in response to rectangle-read requests issued from the motion detection unit 63. The hit rate of rectangle-read requests issued by the motion detection unit 63 with respect to the pre-fetch memory 65 is thus improved, thereby increasing the processing speed of motion detection performed by the motion detection unit 63.

The MPEG encoder 60 that is the second embodiment of a moving-picture processing apparatus according to the present invention is configured such that the hit/miss-determination-&-count unit 64 counts the numbers of misses with respect to respective types of misses. Alternatively, provision may be made such that the hit/miss-determination-&-count unit 64 counts the area sizes of misses with respect to respective types of misses.

In this case, the pre-fetch control unit 68 computes the upside miss indicator as first weighting coefficient×the total area size of rectangular portions of upside complete misses+second weighting coefficient×the total area size of overlapping portions between a non-pre-fetch area and the rectangular portions of upside partial misses, computes the downside miss indicator as third weighting coefficient×the total area size of rectangular portions of downside complete misses+fourth weighting coefficient×the total area size of overlapping portions between a non-pre-fetch area and the rectangular portions of downside partial misses, computes the left-hand-side miss indicator as fifth weighting coefficient×the total area size of rectangular portions of left-hand-side complete misses+sixth weighting coefficient×the total area size of overlapping portions between a non-pre-fetch area and the rectangular portions of left-hand-side partial misses, and computes the right-hand-side miss indicator as seventh weighting coefficient×the total area size of rectangular portions of right-hand-side complete misses+eighth weighting coefficient×the total area size of overlapping portions between a non-pre-fetch area and the rectangular portions of right-hand-side partial misses.

If the upside miss indicator is the largest, an upside shift is computed, and the pre-fetch area is shifted to the right by the basic shift amount and shifted upward by the computed upside shift. If the downside miss indicator is the largest, a downside shift is computed, and the pre-fetch area is shifted to the right by the basic shift amount and shifted downward by the computed downside shift. If the left-hand-side miss indicator is the largest, a left-hand-side shift is computed, and the pre-fetch area is shifted to the right by the basic shift amount and shifted to the left by the computed left-hand-side shift. If the right-hand-side miss indicator is the largest, a right-hand-side shift is computed, and the pre-fetch area is shifted to the right by the basic shift amount and further shifted to the right by the computed right-hand-side shift.

The hit/miss-determination-&-count unit 64 may detect an upside miss when the rectangular portion requested by a rectangle-read request causes a miss at a position above any one of a non-pre-fetch area situated on the left of the pre-fetch area, the pre-fetch area, and a non-pre-fetch area situated on the right of the pre-fetch area. The hit/miss-determination-&-count unit 64 may detect a downside miss when the rectangular portion requested by a rectangle-read request causes a miss at a position below any one of the non-pre-fetch area situated on the left of the pre-fetch area, the pre-fetch area, and the non-pre-fetch area situated on the right of the pre-fetch area. The hit/miss-determination-&-count unit 64 may detect a left-hand-side miss when the rectangular portion requested by a rectangle-read request causes a miss at a position on the left of any one of the non-pre-fetch area situated above the pre-fetch area, the pre-fetch area, and the non-pre-fetch area situated below the pre-fetch area. The hit/miss-determination-&-count unit 64 may detect a right-hand-side miss when the rectangular portion requested by a rectangle-read request causes a miss at a position on the right of any one of the non-pre-fetch area situated above the pre-fetch area, the pre-fetch area, and the non-pre-fetch area situated below the pre-fetch area. In this manner, provision may be made such that the number of upside misses, the number of downside misses, the number of left-hand-side misses, and the number of right-hand-side misses are counted separately from each other.

In this case, the pre-fetch control unit 68 computes the upside miss indicator as first weighting coefficient×the number of upside misses, the downside miss indicator as second weighting coefficient×the number of downside misses, the left-hand-side miss indicator as third weighting coefficient×the number of left-hand-side misses, and the right-hand-side miss indicator as fourth weighting coefficient×the number of right-hand-side misses.

If the upside miss indicator is the largest, an upside shift is computed, and the pre-fetch area is shifted to the right by the basic shift amount and shifted upward by the computed upside shift. If the downside miss indicator is the largest, a downside shift is computed, and the pre-fetch area is shifted to the right by the basic shift amount and shifted downward by the computed downside shift. If the left-hand-side miss indicator is the largest, a left-hand-side shift is computed, and the pre-fetch area is shifted to the right by the basic shift amount and shifted to the left by the computed left-hand-side shift. If the right-hand-side miss indicator is the largest, a right-hand-side shift is computed, and the pre-fetch area is shifted to the right by the basic shift amount and further shifted to the right by the computed right-hand-side shift.

The hit/miss-determination-&-count unit 64 may detect an upside miss when the rectangular portion requested by a rectangle-read request causes a miss at a position above any one of a non-pre-fetch area situated on the left of the pre-fetch area, the pre-fetch area, and a non-pre-fetch area situated on the right of the pre-fetch area. The hit/miss-determination-&-count unit 64 may detect a downside miss when the rectangular portion requested by a rectangle-read request causes a miss at a position below any one of the non-pre-fetch area situated on the left of the pre-fetch area, the pre-fetch area, and the non-pre-fetch area situated on the right of the pre-fetch area. The hit/miss-determination-&-count unit 64 may detect a left-hand-side miss when the rectangular portion requested by a rectangle-read request causes a miss at a position on the left of any one of the non-pre-fetch area situated above the pre-fetch area, the pre-fetch area, and the non-pre-fetch area situated below the pre-fetch area. The hit/miss-determination-&-count unit 64 may detect a right-hand-side miss when the rectangular portion requested by a rectangle-read request causes a miss at a position on the right of any one of the non-pre-fetch area situated above the pre-fetch area, the pre-fetch area, and the non-pre-fetch area situated below the pre-fetch area. In this manner, provision may be made such that the area size of rectangular portions of upside misses, the area size of rectangular portions of downside misses, the area size of rectangular portions of left-hand-side misses, and the area size of rectangular portions of right-hand-side misses are counted separately from each other.

In this case, the pre-fetch control unit 68 computes the upside miss indicator as first weighting coefficient×the area size of rectangular portions of upside misses, the downside miss indicator as second weighting coefficient×the area size of rectangular portions of downside misses, the left-hand-side miss indicator as third weighting coefficient×the area size of rectangular portions of left-hand-side misses, and the right-hand-side miss indicator as fourth weighting coefficient×the area size of rectangular portions of right-hand-side misses.

If the upside miss indicator is the largest, an upside shift is computed, and the pre-fetch area is shifted to the right by the basic shift amount and shifted upward by the computed upside shift. If the downside miss indicator is the largest, a downside shift is computed, and the pre-fetch area is shifted to the right by the basic shift amount and shifted downward by the computed downside shift. If the left-hand-side miss indicator is the largest, a left-hand-side shift is computed, and the pre-fetch area is shifted to the right by the basic shift amount and shifted to the left by the computed left-hand-side shift. If the right-hand-side miss indicator is the largest, a right-hand-side shift is computed, and the pre-fetch area is shifted to the right by the basic shift amount and further shifted to the right by the computed right-hand-side shift.

Further, the present invention is not limited to these embodiments, but various variations and modifications may be made without departing from the scope of the present invention.

What is claimed is:

1. A moving-picture processing apparatus, comprising:
    a pre-fetch memory pre-fetching a portion of a decoded picture stored in an external memory; and
    a miss/hit determination unit determining a manner in which a miss occurs in response to a read request to the pre-fetch memory specifying a rectangular portion in the decoded picture, the miss/hit determination unit including a determining unit detecting an upside complete miss in response to the rectangular portion fully included in a non-pre-fetch area situated above the pre-fetch area, an upside partial miss in response to the rectangular portion straddling a border between the pre-fetch area and the non-pre-fetch area situated above the pre-fetch area, a downside complete miss in response to the rectangular portion fully included in a non-pre-fetch area situated below the pre-fetch area, and a downside partial miss in response to the rectangular portion straddling a border between the pre-fetch area and the non-pre-fetch area situated below the pre-fetch area.

2. The moving-picture processing apparatus as claimed in claim 1, further comprising a pre-fetch adjustment unit adjusting a pre-fetch area pre-fetched by the pre-fetch memory in response to a number of hits or a number of misses which is counted for each of miss/hit types by the miss/hit determination unit.

3. The moving-picture processing apparatus as claimed in claim 2, wherein the pre-fetch adjustment unit is configured to adjust the pre-fetch area upon completion of decoding of a macroblock line.

4. The moving-picture processing apparatus as claimed in claim 1, wherein the miss/hit determination unit includes counters counting a number of the upside complete miss, a number of the upside partial miss, a number of the downside complete miss, and a number of the downside partial miss, respectively.

5. The moving-picture processing apparatus as claimed in claim 1, wherein the miss/hit determination unit includes counters counting an area size of rectangular portions corresponding to the upside complete miss, an area size of rectangular portions corresponding to the upside partial miss, an area size of rectangular portions corresponding to the downside complete miss, and an area size of rectangular portions corresponding to the downside partial miss, respectively.

6. A method of processing a moving picture in a moving-picture processing apparatus including a pre-fetch memory, comprising:
    pre-fetching a portion of a decoded picture stored in an external memory; and
    determining a manner in which a hit or a miss occurs in response to a read request to the pre-fetch memory specifying a rectangular portion in the decoded picture, including detecting an upside complete miss in response to the rectangular portion fully included in a non-pre-fetch area situated above pre-fetch area, an upside partial miss in response to the rectangular portion straddling a border between the pre-fetch area and the non-pre-fetch area situated above the pre-fetch area, a downside complete miss in response to the rectangular portion fully included in a non-pre-fetch area situated below the pre-fetch area, and an downside partial miss in response to the rectangular portion straddling a border between the pre-fetch area and the non-pre-fetch area situated below the pre-fetch area.

7. The method as claimed in claim 6, further comprising adjusting a pre-fetch area in response to a number of hits or a number of misses which is determined for each of miss/hit types.

8. The method as claimed in claim 7, wherein adjusting the pre-fetch area is performed upon completion of decoding of a macroblock line.

9. The method as claimed in claim 6, wherein determining a manner includes counting a number of the upside complete miss, a number of the upside partial miss, a number of the downside complete miss, and a number of the downside partial miss, respectively.

10. The method as claimed in claim 6, wherein determining a manner includes separately counting an area size of rectangular portions corresponding to the upside complete miss, an area size of rectangular portions corresponding to the upside partial miss, an area size of rectangular portions corresponding to the downside complete miss, and an area size of rectangular portions corresponding to the downside partial miss.

11. A moving-picture processing apparatus, comprising:
a pre-fetch memory pre-fetching a portion of a decoded picture stored in an external memory; and
a miss/hit determination unit determining a manner in which a miss occurs in response to a read request to the pre-fetch memory specifying a rectangular portion in the decoded picture, the miss/hit determination unit including a determining unit detecting
a left-hand-side complete miss in response to the rectangular portion fully included in a non-pre-fetch area situated on the left of any one of a non-pre-fetch area situated above the pre-fetch area, the pre-fetch area, and a non-pre-fetch area situated below the pre-fetch area,
a left-hand-side partial miss in response to the rectangular portion straddling a border between a non-pre-fetch area situated on the left of any one of a non-pre-fetch area situated above the pre-fetch area, the pre-fetch area, and a non-pre-fetch area situated below the pre-fetch area and any one of the non-pre-fetch area situated above the pre-fetch area, the pre-fetch area, and the non-pre-fetch area situated below the pre-fetch area,
a right-hand-side complete miss in response to the rectangular portion fully included in a non-pre-fetch area situated on the right of any one of a non-pre-fetch area situated above the pre-fetch area, the pre-fetch area, and a non-pre-fetch area situated below the pre-fetch area, and
a right-hand-side partial miss in response to the rectangular portion straddling a border between a non-pre-fetch area situated on the right of any one of a non-pre-fetch area situated above the pre-fetch area, the pre-fetch area, and a non-pre-fetch area situated below the pre-fetch area and any one of the non-pre-fetch area situated above the pre-fetch area, the pre-fetch area, and the non-pre-fetch area situated below the pre-fetch area.

12. A method of processing a moving picture in a moving-picture processing apparatus including a pre-fetch memory, configured to have a pre-fetch area, comprising:
pre-fetching a portion of a decoded picture stored in an external memory; and
determining a manner in which a hit or a miss occurs in response to a read request to the pre-fetch memory specifying a rectangular portion in the decoded picture, including
a left-hand-side complete miss in response to the rectangular portion fully included in a non-pre-fetch area situated on the left of any one of a non-pre-fetch area situated above the pre-fetch area, the pre-fetch area, and a non-pre-fetch area situated below the pre-fetch area,
a left-hand-side partial miss in response to the rectangular portion straddling a border between a non-pre-fetch area situated on the left of any one of a non-pre-fetch area situated above the pre-fetch area, the pre-fetch area, and a non-pre-fetch area situated below the pre-fetch area and any one of the non-pre-fetch area situated above the pre-fetch area, the pre-fetch area, and the non-pre-fetch area situated below the pre-fetch area,
a right-hand-side complete miss in response to the rectangular portion fully included in a non-pre-fetch area situated on the right of any one of a non-pre-fetch area situated above the pre-fetch area, the pre-fetch area, and a non-pre-fetch area situated below the pre-fetch area, and
a right-hand-side partial miss in response to the rectangular portion straddling a border between a non-pre-fetch area situated on the right of any one of a non-pre-fetch area situated above the pre-fetch area, and the pre-fetch area, and a non-pre-fetch area situated below the pre-fetch area and any one of the non-pre-fetch area situated above the pre-fetch area, the pre-fetch area, and the non-pre-fetch area situated below the pre-fetch area.

* * * * *